US011554865B2

(12) United States Patent
Tao et al.

(10) Patent No.: US 11,554,865 B2
(45) Date of Patent: Jan. 17, 2023

(54) VERTICAL TAKE-OFF AND LANDING (VTOL) AIRCRAFT AND RELATED METHODS

(71) Applicant: Aurora Flight Sciences Corporation, Manassas, VA (US)

(72) Inventors: Tony Shuo Tao, Somerville, MA (US); William Cooper Thalheimer, Cambridge, MA (US); Robert William Parks, San Jose, CA (US); Adrian Hachen, Bern (CH)

(73) Assignee: AURORA FLIGHT SCIENCES CORPORATION, Manassas, VA (US)

( * ) Notice: Subject to any disclaimer, the term of this patent is extended or adjusted under 35 U.S.C. 154(b) by 323 days.

(21) Appl. No.: 16/794,040

(22) Filed: Feb. 18, 2020

(65) Prior Publication Data

US 2021/0253234 A1    Aug. 19, 2021

(51) Int. Cl.
*B64C 29/00* (2006.01)
*B64C 27/28* (2006.01)
*B64C 19/02* (2006.01)

(52) U.S. Cl.
CPC .......... *B64C 29/0033* (2013.01); *B64C 19/02* (2013.01); *B64C 27/28* (2013.01); *B64C 29/0025* (2013.01)

(58) Field of Classification Search
CPC ............ B64C 29/0033; B64C 29/0025; B64C 17/02; B64C 27/28
See application file for complete search history.

(56) References Cited

U.S. PATENT DOCUMENTS

| | | |
|---|---|---|
| 1,987,788 A | 1/1935 | Morton |
| D210,809 S | 4/1968 | Stearman |
| D277,976 S | 3/1985 | Holloway et al. |
| 4,739,957 A | 4/1988 | Vess et al. |
| D616,804 S | 6/2010 | Manley et al. |
| D628,528 S | 12/2010 | Cabezas Carrasco |
| D630,996 S | 1/2011 | Gall et al. |
| D642,968 S | 8/2011 | Zhao |

(Continued)

FOREIGN PATENT DOCUMENTS

| | | |
|---|---|---|
| EP | 3466812 | 4/2019 |
| GB | 935715 | 9/1963 |

(Continued)

OTHER PUBLICATIONS

European Patent Office, Extended European Search Report for related European Patent Application No. 21157781, dated Jun. 17, 2021.

*Primary Examiner* — Tye William Abell
(74) *Attorney, Agent, or Firm* — Kolitch Romano Dascenzo Gates LLC

(57) ABSTRACT

Winged tilt-rotor vertical take-off and landing (VTOL) aircraft and related methods are disclosed. Aircraft comprise an airframe comprising one or more wings; one or more tilt-adjustable rotors positioned forward of the one or more wings; and one or more fixed-tilt rotors positioned behind at least one of the one or more wings. Methods comprise tilting only one or more forward rotors positioned in front of one or more wings of the aircraft, and not tilting one or more rearward rotors positioned behind at least one of the one or more wings.

20 Claims, 5 Drawing Sheets

(56) References Cited

U.S. PATENT DOCUMENTS

| | | |
|---|---|---|
| D651,156 S | 12/2011 | Gundlach |
| D691,547 S | 10/2013 | Hall et al. |
| 8,622,334 B2 | 1/2014 | Drela et al. |
| 8,721,383 B2 | 5/2014 | Woodworth et al. |
| 8,800,912 B2 | 8/2014 | Oliver |
| D712,310 S | 9/2014 | Gundlach et al. |
| D725,576 S | 3/2015 | Vickers |
| 9,010,683 B2 | 4/2015 | Gundlach et al. |
| D732,458 S | 6/2015 | Dutertre |
| D733,029 S | 6/2015 | Dutertre |
| 9,085,355 B2 | 7/2015 | DeLorean |
| D736,140 S | 8/2015 | Moller |
| D739,807 S | 9/2015 | Strand et al. |
| 9,346,542 B2 | 5/2016 | Leng |
| D763,733 S | 8/2016 | Gattelli et al. |
| 9,475,579 B2 * | 10/2016 | Fredericks .............. B64D 27/26 |
| 9,505,484 B1 | 11/2016 | Al-Sabah |
| 9,562,773 B2 | 2/2017 | Paduano et al. |
| D795,160 S | 8/2017 | Koppenwallner |
| D799,402 S | 10/2017 | Cummings |
| D807,273 S | 1/2018 | Koppenwallner |
| D808,328 S | 1/2018 | Ivans et al. |
| D809,448 S | 2/2018 | Schmiderer et al. |
| D810,621 S | 2/2018 | Sadek |
| D813,143 S | 3/2018 | Belik et al. |
| D822,579 S | 7/2018 | Lienhard et al. |
| D824,321 S | 7/2018 | Ivans et al. |
| D824,804 S | 8/2018 | Tian |
| D829,633 S | 10/2018 | Cummings |
| D832,141 S | 10/2018 | Ferner |
| D833,364 S | 11/2018 | Schmiderer et al. |
| D844,537 S | 4/2019 | MacAndrew et al. |
| D845,169 S | 4/2019 | Cui et al. |
| 10,252,815 B2 | 4/2019 | Murugappan et al. |
| D850,357 S | 6/2019 | Cummings |
| D872,681 S | 1/2020 | Tzarnotzky et al. |
| D873,200 S | 1/2020 | Langford, III et al. |
| 10,543,905 B1 * | 1/2020 | Kwon ..................... B64D 27/24 |
| D875,022 S | 2/2020 | Cummings |
| 10,625,852 B2 | 4/2020 | Bevirt et al. |
| 2014/0339372 A1 * | 11/2014 | Dekel ..................... B64C 29/00 |
| | | 244/7 R |
| 2015/0344134 A1 | 12/2015 | Cruz Ayoroa |
| 2016/0214710 A1 * | 7/2016 | Brody ................... B64D 35/04 |
| 2017/0003690 A1 | 1/2017 | Tanahashi |
| 2018/0079503 A1 | 3/2018 | Ivans et al. |
| 2018/0162525 A1 | 6/2018 | St. Clair et al. |
| 2018/0215465 A1 * | 8/2018 | Renteria ................ B64C 25/10 |
| 2019/0127056 A1 | 5/2019 | Weekes et al. |
| 2019/0135424 A1 | 5/2019 | Baity et al. |
| 2019/0256194 A1 * | 8/2019 | Vander Lind ....... B64C 29/0025 |
| 2019/0291863 A1 | 9/2019 | Lyasoff et al. |
| 2020/0164972 A1 * | 5/2020 | Kiesewetter ........... B64C 27/28 |
| 2020/0269975 A1 * | 8/2020 | Fink ...................... B64C 27/26 |
| 2021/0031910 A1 * | 2/2021 | Cornes ................... B64C 27/30 |
| 2021/0206483 A1 * | 7/2021 | Lee ..................... B64C 29/0033 |
| 2022/0009626 A1 * | 1/2022 | Baharav ................. B64C 39/04 |

FOREIGN PATENT DOCUMENTS

| | | |
|---|---|---|
| WO | WO 2015/143093 | 9/2015 |
| WO | WO 2016/018486 | 2/2016 |
| WO | WO 2019/202325 | 10/2019 |
| WO | WO 2019/211875 | 11/2019 |

* cited by examiner

VERTICAL TAKE-OFF AND LANDING (VTOL) AIRCRAFT AND RELATED METHODS

FIELD

The present disclosure relates to vertical take-off and landing (VTOL) aircraft.

BACKGROUND

Unlike conventional aircraft, VTOL aircraft, like helicopters, do not need a runway. They can lift off and land vertically, which means they only need a landing/launch surface large enough to accommodate their airframe. Thus, VTOL aircraft are versatile because they can take off and land from much tighter spaces (and therefore from many more locations) than conventional fixed-wing aircraft. Helicopters, for example, land on, and take off from, building rooftops even in densely populated cities. Some VTOL aircraft use wings because, when cruising, wings are more efficient and lower-maintenance than rotors, thereby extending the range and speed of the aircraft, and enabling longer, faster flights. Helicopters and other wingless VTOL aircraft must utilize flaps or other flight control surfaces to point the rotors in the direction of motion. This is why helicopters initially tilt their noses downward when transitioning from hovering (vertical flight) to cruising (horizontal flight). Winged VTOL aircraft on the other hand, employ various methods for transitioning between hovering and cruising.

Some winged VTOL aircraft use tilting wings to transition between hovering and cruising (and are thus often referred to as "tilt-wing aircraft"). However, tilting an entire wing requires much more force than the smaller flight control surfaces (e.g., aileron, elevator, and rudder) of conventional fixed-wing aircraft. Further, such wings are highly susceptible to wind gusts when they are vertically oriented for hovering.

Thus, other VTOL aircraft attempt to transition between hovering and cruising by tilting just the rotors (not the entire wings), and are thus often referred to as "tilt-rotor aircraft." In particular, some tilt-rotor aircraft comprise a forward set of rotors (positioned forward of the wings) and a rearward set of rotors (positioned behind the wings) that are all tilted simultaneously. A single tilt mechanism may be configured to tilt both a forward rotor and a rearward rotor. Thus, the forward and rearward rotors cannot be tilted independently of one another. However, tilting all of the rotors still requires substantial force, and such aircraft can become aerodynamically unstable when transitioning between hovering and cruising.

Further, both such designs (both tilt-wing and tilt-rotor designs) create the potential for single-point non-performance events because the aircraft may rely on a single tilting mechanism (either one mechanism that tilts the wings or one mechanism that tilts multiple rotors) to transition between hovering and cruising. Because VTOL must transition from cruising to hovering to land, the wing-tilting may be critical to the aircraft's ability to complete a flight. Thus, non-performance of just one of the tilt mechanisms mid-flight may not be tolerated in many of the above tilt designs.

Other winged VTOL aircraft attempt to overcome this problem by including two separate sets of fixed-position rotors, one dedicated for vertical flight, and another for horizontal flight. However, such aircraft require twice as many rotors (one set for vertical flying and a second set for horizontal flying), making the aircraft heavier (and thus less energy efficient) and more expensive.

Further, all of the winged VTOL aircraft described above (the fixed-rotor aircraft, the tilt-rotor aircraft, and the tilt-wing aircraft) suffer from aerodynamic difficulties when transitioning from hovering to cruising due to the interaction between the flow field generated by the hover mode, the incoming airflow, and the wing geometry. The transition maneuver presents the highest power demand on the aircraft and thus may require a larger, less efficient, and more costly aircraft. Therefore, a winged VTOL that more efficiently transitions between the hover and cruise modes is desired.

SUMMARY

Winged tilt-rotor VTOL aircraft are disclosed. For example, an aircraft comprises an airframe comprising one or more wings; one or more tilt-adjustable rotors positioned forward of the one or more wings; and one or more fixed-tilt rotors positioned behind at least one of the one or more wings. The one or more tilt-adjustable rotors are adjustable in that they are configured to be selectively tilted between a vertical-thrusting position (for hovering), and a forward-thrusting position (for cruising). In some examples, the fixed-tilt rotors are not configured to be tilted, and remain fixed such that their axis of rotation is orthogonal to a pitch of the aircraft.

In some examples, a method for enhancing operation of an aircraft comprises tilting only one or more forward rotors positioned in front of one or more wings of the aircraft, while maintaining a fixed tilt angle of one or more rearward rotors positioned behind at least one of the one or more wings. In some examples, the method comprises selectively tilting only the one or more forward rotors when transitioning between a hover mode and a cruise mode.

DESCRIPTION

Winged VTOL aircraft and related methods are disclosed. Generally, in the figures, elements that are likely to be included in a given example are illustrated in solid lines, while elements that are optional to a given example are illustrated in dashed lines. Further, some elements illustrated in solid lines are illustrated in different positions using dash-dot lines. However, elements that are illustrated in solid lines are not essential to all examples of the present disclosure, and an element shown in solid lines may be omitted from a particular example without departing from the scope of the present disclosure.

FIGS. 1-4 illustrate various examples of a winged VTOL aircraft in which only the forward rotor(s) (the one or more rotors positioned forward of the wings) tilt. Thus, the rotors positioned behind at least one of the wings do not tilt (are fixed) and may be oriented in a horizontal position for hovering, in some examples. However, because the forward rotors are configured to tilt, they may be used to help generate vertical thrust during hovering and horizontal thrust during cruising. That is, the rotors may be used to generate thrust during both cruising and hovering, and are not a parasitic loss during hovering like the fixed-position vertical rotors of aircraft having separate horizontal and vertical rotors. And, rather than tilting all of the rotors when transitioning between hovering and cruising (which may make the aircraft aerodynamically unstable and require substantial force), the winged VTOL aircraft illustrated in FIGS. 1-4 only tilt one or more of the forward rotors, thereby lowering the tilting forces needed to transition between hovering and cruising, and increasing the stability of the aircraft during the transition. Put simply, the winged VTOL aircraft illustrated in FIGS. 1-4 provide smoother and more effortless transitions between hovering and cruising than other winged VTOL.

And, as will be described in greater detail below, each of the forward rotors of the winged VTOL aircraft illustrated in FIGS. 1-4 are configured to be independently tilted in some examples. Such a design increases redundancies in the tilt system, thereby reducing the chance that non-performance of one of the tilt mechanisms will negatively impact flight characteristics. Put simply, such a design increases the reliability and performance of the tilt system and the overall propulsion system, making for a safer aircraft.

Figure 1:
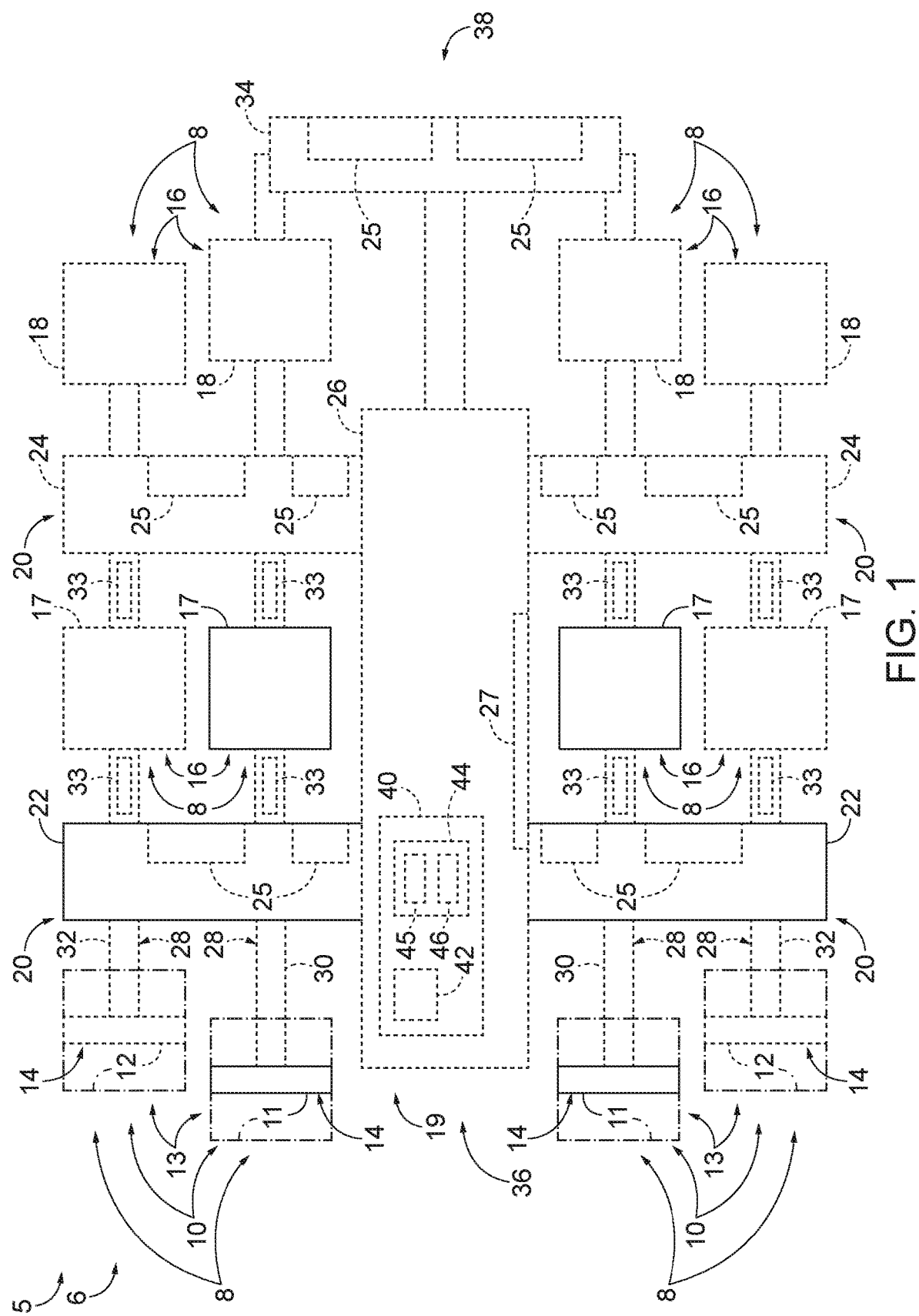
FIG. 1 is a schematic representation of winged VTOL aircraft, according to the present disclosure.

Beginning with FIG. 1, it schematically illustrates aircraft 5 comprising an airframe 19, and a propulsion system 6 configured to propel the airframe 19. The airframe 19 comprises one or more wings 20 and optionally comprises a fuselage 26 configured to carry one or more of cargo, crew, and passengers. The fuselage 26 optionally comprises a door 27 configured to selectively open to permit ingress and egress of one or more of the crew, passengers, and cargo. The propulsion system 6 comprises rotors 8, and more specifically, comprises one or more tilt-adjustable rotors 10 positioned forward of the one or more wings 20 and one or more fixed-tilt rotors 16 positioned behind at least one of the one or more wings 20. In some examples, the one or more fixed-tilt rotors 16 are arranged in separate rows positioned in front of, and behind, one another. Thus, the one or more rows of the fixed-tilt rotors 16, and the single row of the one or more tilt-adjustable rotors 10 positioned forward of the one or more wings 20 form a grid of rotors, in some examples. For example, the rotors 8 may be arranged in one or more of: a 3×4 configuration (3 rows of four rotors), a 2×4 configuration, a 4×4 configuration, and a 2×6 configuration, although other grid configurations are possible.

As described above, the one or more tilt-adjustable rotors 10 are configured to be selectively tilted. In particular, an axis of rotation of the one or more tilt-adjustable rotors 10 is configured to be selectively tilted relative to a pitch of the aircraft 5. Thus, in the description herein, "tilting the one or more tilt-adjustable rotors 10" refers to tilting the axis of rotation of the one or more tilt-adjustable rotors 10 such that the direction in which the one or more tilt-adjustable rotors 10 generate thrust tilts relative to the pitch of the aircraft 5.

Additionally, the one or more fixed-tilt rotors 16 are not configured to tilt relative to the pitch of the aircraft 5. Thus, the one or more fixed-tilt rotors 16 may have a fixed tilt angle. In particular, the tilt angle may be defined as the angle between the axis of rotation (thrust vector) of the one or more fixed-tilt rotors 16 and a pitch of the aircraft 5. In some examples, the one or more fixed-tilt rotors 16 are fixed in a horizontal position, such that their axis of rotation is substantially orthogonal to a pitch of the aircraft 5 (thus they may have a tilt angle of approximately 90 degrees), and are thus configured to provide vertical thrust (antiparallel to gravity) when the pitch of the aircraft is substantially parallel to level ground (orthogonal to gravity). Herein, the term "substantially" when used in connection with an orientation means within five angular degrees of the stated orientation. Thus, the pitch of the aircraft is substantially parallel to level ground when it is within five angular degrees of being parallel to level ground, or horizontal. In some such examples, the one or more tilt-adjustable rotors 10 are configured to be adjusted to the horizontal position to operate the aircraft 5 in a hover mode.

Providing such thrust in the vertical direction (e.g., operating in the hover mode) enables the aircraft 5 to take off and land vertically. As such, the aircraft 5 may be a VTOL aircraft, and thus may be referred to herein as "VTOL aircraft 5." Further, because the aircraft 5 comprises the one or more wings 20, the aircraft 5 may be referred to herein as "winged VTOL 5." Finally, because the one or more tilt-adjustable rotors 10 are configured to be tilted, the aircraft 5 may be referred to herein as "winged tilt-rotor VTOL aircraft 5."

Figure 3:
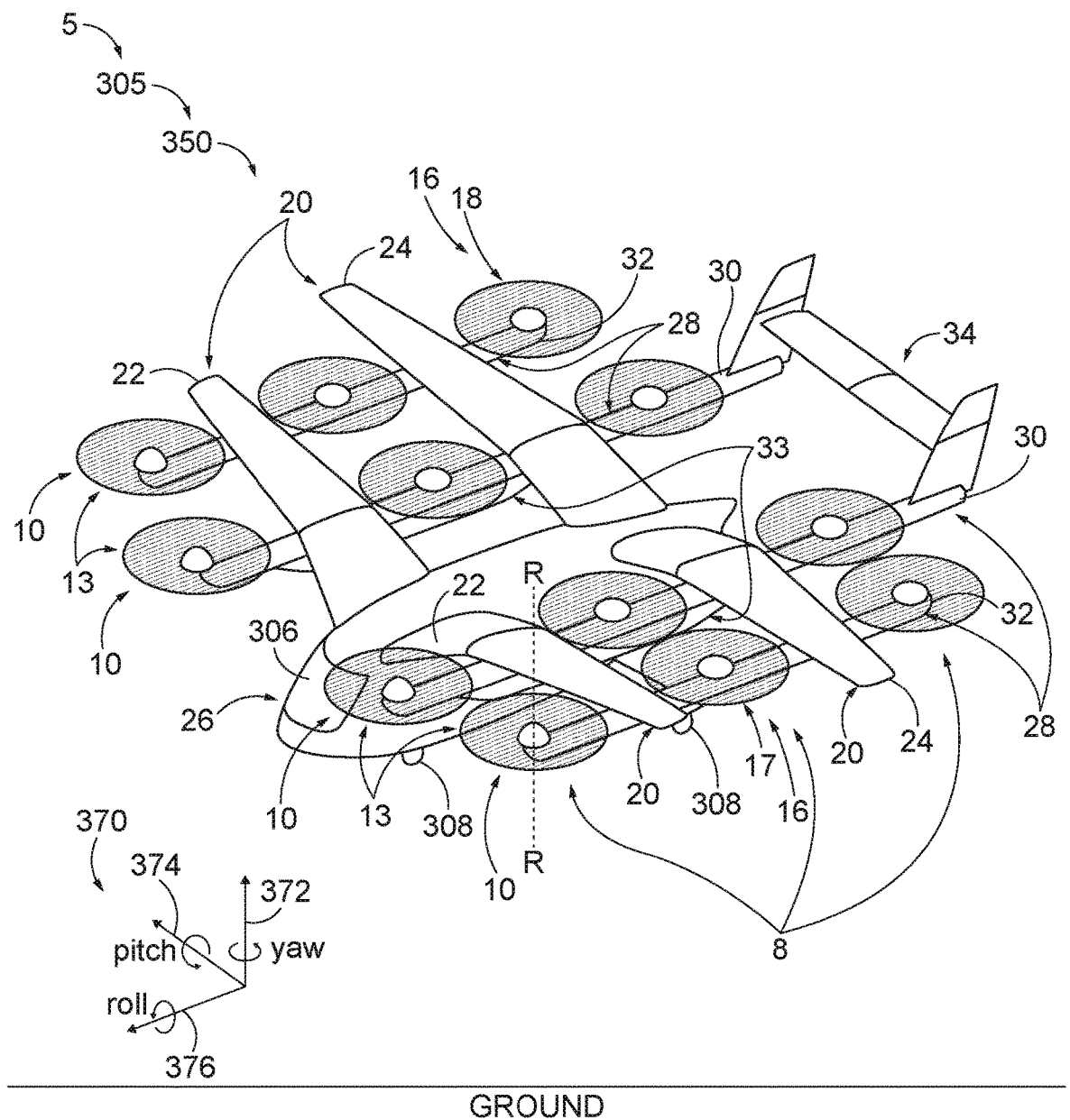
FIG. 3 is an isometric view of an example winged VTOL aircraft shown in a hover mode, according to the present disclosure.
Figure 4:
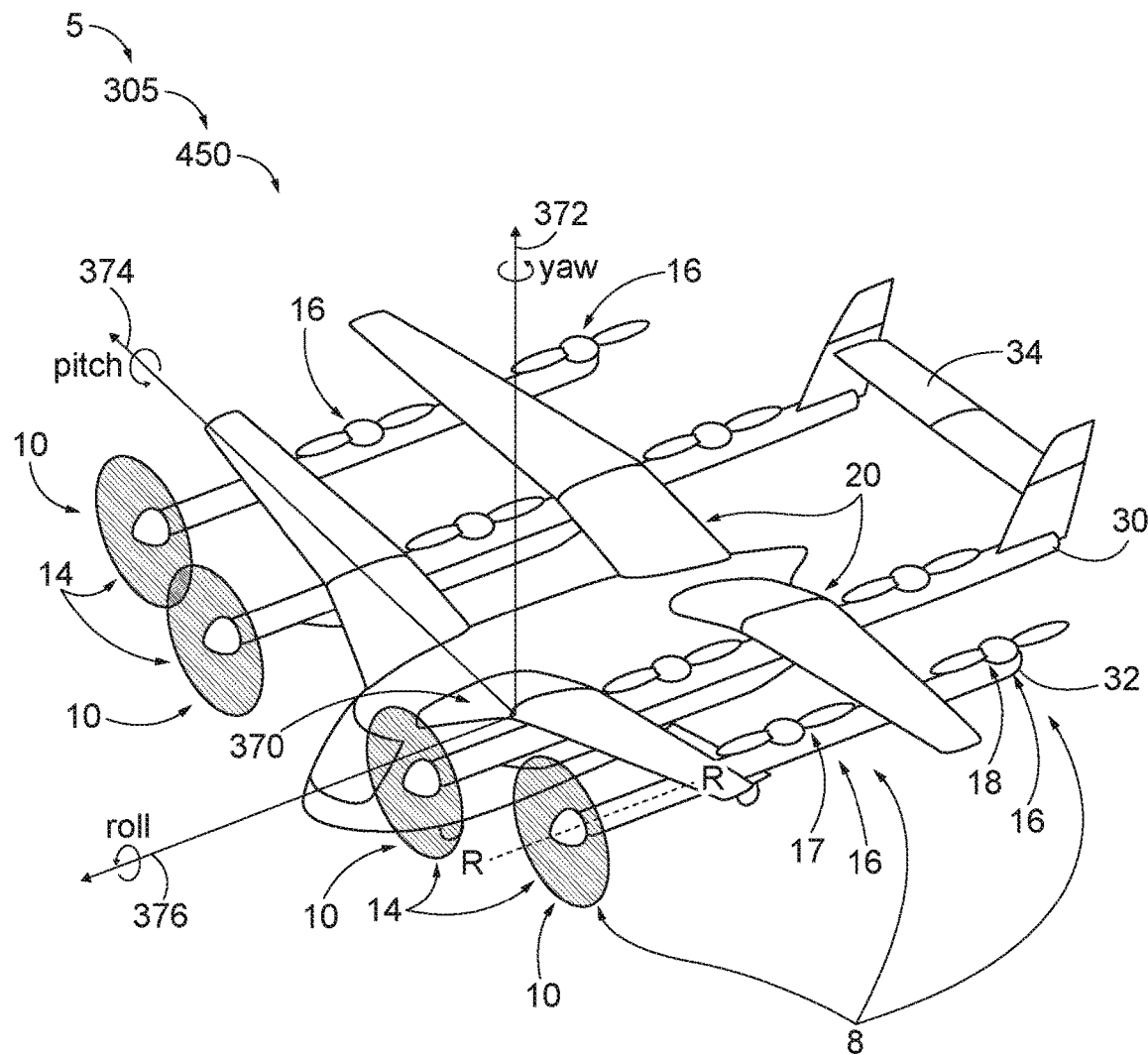
FIG. 4 is an isometric view of the example winged VTOL aircraft of FIG. 3 shown in a cruise mode, according to the present disclosure.

The one or more tilt-adjustable rotors 10 are configured to tilt relative to a pitch of the aircraft 5 (i.e., the tilt angle of the tilt-adjustable rotors 10 is adjustable). In particular, the one or more tilt-adjustable rotors 10 are configured to be selectively tilted between a first position 13 (illustrated in dash-dot lines in FIG. 1) and a second position 14 (illustrated in solid lines in FIG. 1). Pitch refers to the angle the nose (e.g., front 36) of the aircraft 5 points relative to the horizon. FIGS. 3 and 4, which will be described in greater detail below, help visualize this pitch by showing a transverse axis 374 or pitch axis 374, motion about which changes the pitch.

In one example, the first position 13 is a hover position in which the one or more tilt-adjustable rotors 10 are configured to provide a substantially (within five degrees antiparallel to gravity) vertical thrust (relative to gravity) and the second position 14 is a cruise position in which the one or more tilt-adjustable rotors 10 are configured to provide a substantially horizontal thrust (relative to gravity). Thus, the first position may be referred to as a forward-thrusting position, and/or a horizontal-thrusting position, and the second position may be referred to as a vertical-thrusting position.

As one such example, the first position 13 is a horizontal position in which the one or more tilt-adjustable rotors 10 are parallel to a pitch of the aircraft 5, and an axis of rotation of the one or more tilt-adjustable rotors 10 is orthogonal to the pitch of the aircraft 5. Additionally or alternatively, the second position 14 is a vertical position in which the one or more tilt-adjustable rotors 10 are orthogonal to the pitch of the aircraft 5, and the axis of rotation of the one or more tilt-adjustable rotors is parallel to the pitch of the aircraft 5. Thus, in such examples where the first position 13 is the horizontal position and the second position 14 is the vertical position, the one or more tilt-adjustable rotors 10 are configured to tilt approximately 90 degrees.

However, in other such examples, the first position 13 is different than the horizontal position and/or the second position 14 is different than the vertical position. For example, the first position 13 may be a position past the horizontal position, where the axis of rotation (and thus the direction of thrust) of the one or more tilt-adjustable rotors 10 points towards a rear 38 of the aircraft 5. In another example, the first position 13 may be a position closer to the vertical position than the horizontal position, where the axis of rotation (and thus the direction of thrust) of the one or more tilt-adjustable rotors 10 points towards the front 36 of the aircraft 5. In yet further examples, the one or more tilt-adjustable rotors 10 are configured to tilt more than or less than 90 degrees.

In some examples, the one or more tilt-adjustable rotors 10 are configured to be independently tilted—and thus in some such examples, differentially tilted. For example, and as described below in greater detail, the one or more tilt-adjustable rotors 10 are differentially tilted (e.g., tilted to different positions) to accomplish yaw control. In some examples, the independent selective tilting is accomplished via separate tilt mechanisms. As one such example, each of the one or more tilt-adjustable rotors 10 is coupled to its own tilt mechanism (e.g., tilt mechanism 202 described below with reference to FIG. 2), and each tilt mechanism is independently electrically controlled by a controller 40.

An increase in safety, reliability, and performance of the propulsion system 6 is achieved by providing such independent selective tilting of the one or more tilt-adjustable rotors 10. In particular, because each of the one or more tilt-adjustable rotors 10 may comprise its own tilt mechanism, non-performance of one of the tilt mechanisms does not affect the ability of the other rotors (the rotors not coupled to the non-performing tilt mechanism) to tilt. In this way, the propulsion system 6 comprises added redundancy to ensure that non-performance of one of the tilt mechanisms does not compromise the ability to control and land the aircraft 5.

In some examples, the one or more tilt-adjustable rotors 10 are variably adjustable and are configured to tilt to more positions that just the first position 13 and the second position 14. In particular, the one or more tilt-adjustable rotors 10 are configured to tilt to one or more positions between the first position 13 and the second position 14 in some examples. As just one example, one or more of the one or more tilt-adjustable rotors 10 are configured to be selectively tilted between the first position 13 and the second position 14 to adjust a yaw of the aircraft 5. In particular, tilting one of the one or more tilt-adjustable rotors 10 towards the first position 13 may cause the aircraft 5 to turn towards the side of the aircraft 5 on which that rotor (the one that was tilted towards the first position 13) is located. For example, if one of the one or more tilt-adjustable rotors 10 that is positioned on the right side of the aircraft 5 is selectively tilted towards the first position 13 while the other rotors of the one or more tilt-adjustable rotors 10 remain in the second position 14, the aircraft 5 may turn to the right (referred to as "positive yawing motion"), and vice versa for a rotor positioned on the left side of the aircraft 5.

In this way, the one or more tilt-adjustable rotors 10 may be configured to serve the yaw adjustment functions traditionally performed by a rudder. More simply, the one or more tilt-adjustable rotors 10 may be configured to serve the role of a conventional rudder, and thus may replace the rudder. As such, the aircraft 5 does not include a rudder, in some examples. Thus, a reduction in the cost and complexity of the aircraft 5 is achieved in examples where the rudder is omitted. And, even in examples where a rudder is still included in the aircraft 5, the ability of the tilt-adjustable rotors 10 to provide yaw control adds redundancy to the flight control system. Put simply, the tilt-adjustable rotors 10 may serve as a back-up to the rudder in the event of rudder non-performance. Thus, even in examples where a rudder is included in the aircraft 5, an increase in the reliability, performance, and safety of the yaw control system is achieved by configuring the one or more tilt-adjustable rotors 10 to be variably adjusted to more positions than just the first position 13 and the second position 14.

The one or more tilt-adjustable rotors 10 are positioned forward of the one or more wings 20 relative to the front 36 and the rear 38 of the aircraft 5. In the description herein, "forward" and "rearward" are used to refer to the relative positioning of components in relation to a horizontal direction of motion of the aircraft 5 when the one or more tilt-adjustable rotors 10 are tilted towards the second position 14, such that they are generating at least some non-zero horizontal thrust with respect to gravity (e.g., at least a component of the thrust vector of the one or more tilt-adjustable rotors 10 is orthogonal to gravity). For example, when the one or more tilt-adjustable rotors 10 are tilted to the second position 14, the tilt-adjustable rotors 10 generate thrust in a direction that is not antiparallel with respect to gravity, and thus cause the aircraft 5 to move to the left in the example of FIG. 1.

Example axis system 370 shown in FIGS. 3 and 4 further illustrates what is meant by "forward" and "rearward." On axis system 370, "forward" refers to a more positive position on longitudinal axis 376 (also referred to herein as "roll axis 376"), and vice versa for "rearward." Thus, the "front 36" and the "rear 38" of the aircraft 5 are used to refer to ends of the aircraft 5 in relation to the direction of horizontal motion of the aircraft 5.

Similarly, "above" and "below" are used herein to describe the relative positioning of components in relation to a vertical direction of thrust generated by the one or more fixed-tilt rotors 16. Example axis system 370 shown in FIGS. 3 and 4 further illustrates what is meant by "above" and "below." On axis system 370, "above" refers to a more positive position on vertical axis 372 (also referred to herein as "yaw axis 372"), and vice versa for "below." Thus, the "top" and the "bottom" of components of the aircraft 5 are used to refer to ends of the components in relation to the direction of thrust generated by the one or more fixed-position rotors 16.

In some examples, the entire rotor of each of the one or more tilt-adjustable rotors 10 is positioned forward of the one or more wings 20. In some such examples, the one or more tilt-adjustable rotors 10 are positioned forward of the one or more wings 20 even in the first position 13, such that no portion of the one or more tilt-adjustable rotors 10 overlaps (e.g., is positioned on top of) the one or more wings 20. That is, the one or more tilt-adjustable rotors 10 fully clear a front/leading edge of the one or more wings 20. However, in other examples, at least a portion of at least one of the one or more tilt-adjustable rotors 10 overlaps with (e.g., extends over the top of) at least one of the one or more wings 20 when the at least one of the one or more tilt-adjustable rotors 10 is in the first position 13 and is spinning.

In some examples, the one or more tilt-adjustable rotors 10 comprise one or more inner rotors 11 and one or more outer rotors 12. For example, as shown in FIG. 1, the one or more tilt-adjustable rotors 10 optionally comprise four rotors, two inner rotors and two outer rotors. However, in other examples, the one or more tilt-adjustable rotors 10 comprise more or less than four rotors. As one such example, the one or more tilt-adjustable rotors 10 comprise two rotors, one on each side of the fuselage 26. In yet another such example, the one or more tilt-adjustable rotors 10 comprise six rotors, three on each side of the fuselage 26. In yet further such examples, the one or more tilt-adjustable rotors 10 comprise eight rotors, four on each side of the fuselage 26.

When included, the one or more outer rotors 12 are positioned farther from a central longitudinal axis of the aircraft 5 than the one or more inner rotors 11. Thus, when the fuselage 26 is included, the one or more outer rotors 12 are positioned farther from the fuselage 26 than the one or more inner rotors 11. In some examples, the one or more inner rotors 11 and the one or more outer rotors 12 are staggered in front of, and behind, one another. As one such example, the one or more outer rotors 12 are positioned rearward of the one or more inner rotors 11, closer to the rear 38 of the aircraft 5 than the one or more inner rotors 11.

Staggering the rotors 8 may reduce a length of one or more support elements 28 configured to support the rotors 8, while also keeping the rotors 8 clear of the one or more wings 20. The one or more wings 20 may be tapered for structural efficiency.

The one or more fixed-tilt rotors 16 are positioned behind the one or more tilt-adjustable rotors 10. In particular, the one or more fixed-tilt rotors 16 are positioned behind at least one of the one or more wings 20 (closer to the rear 38 of the aircraft 5 than at least one of the one or more wings 20). As described above, the one or more fixed-tilt rotors 16 do not tilt (their tilt angle is fixed). More specifically, they do not tilt relative to the pitch of the aircraft 5. That is, the axis of rotation of the one or more fixed-tilt rotors 16 is not configured to be tilted relative to the pitch of the aircraft 5.

As one example, the one or more fixed-tilt rotors 16 are fixed in the horizontal position where an axis of rotation of the one or more fixed-tilt rotors is orthogonal to the pitch of the aircraft 5. In the horizontal position, the rotors 8 face up, in a direction antiparallel to gravity. Thus, when the aircraft is flying vertically upwards (against gravity) the one or more fixed-tilt rotors 16 face up, in the direction that they generate thrust (antiparallel to gravity). In some examples, the one or more fixed-tilt rotors 16 are fixed in the first position 13, such that the one or more fixed-tilt rotors 16 are parallel to the one or more tilt-adjustable rotors 10 when the one or more tilt-adjustable rotors 10 are in the first position 13.

In some examples, the one or more fixed-tilt rotors 16 comprise one or more forward fixed-tilt rotors 17 and one or more aft fixed-tilt rotors 18. When included, the one or more forward fixed-tilt rotors 17 are positioned forward of the one or more aft fixed-tilt rotors 18.

Figure 2:
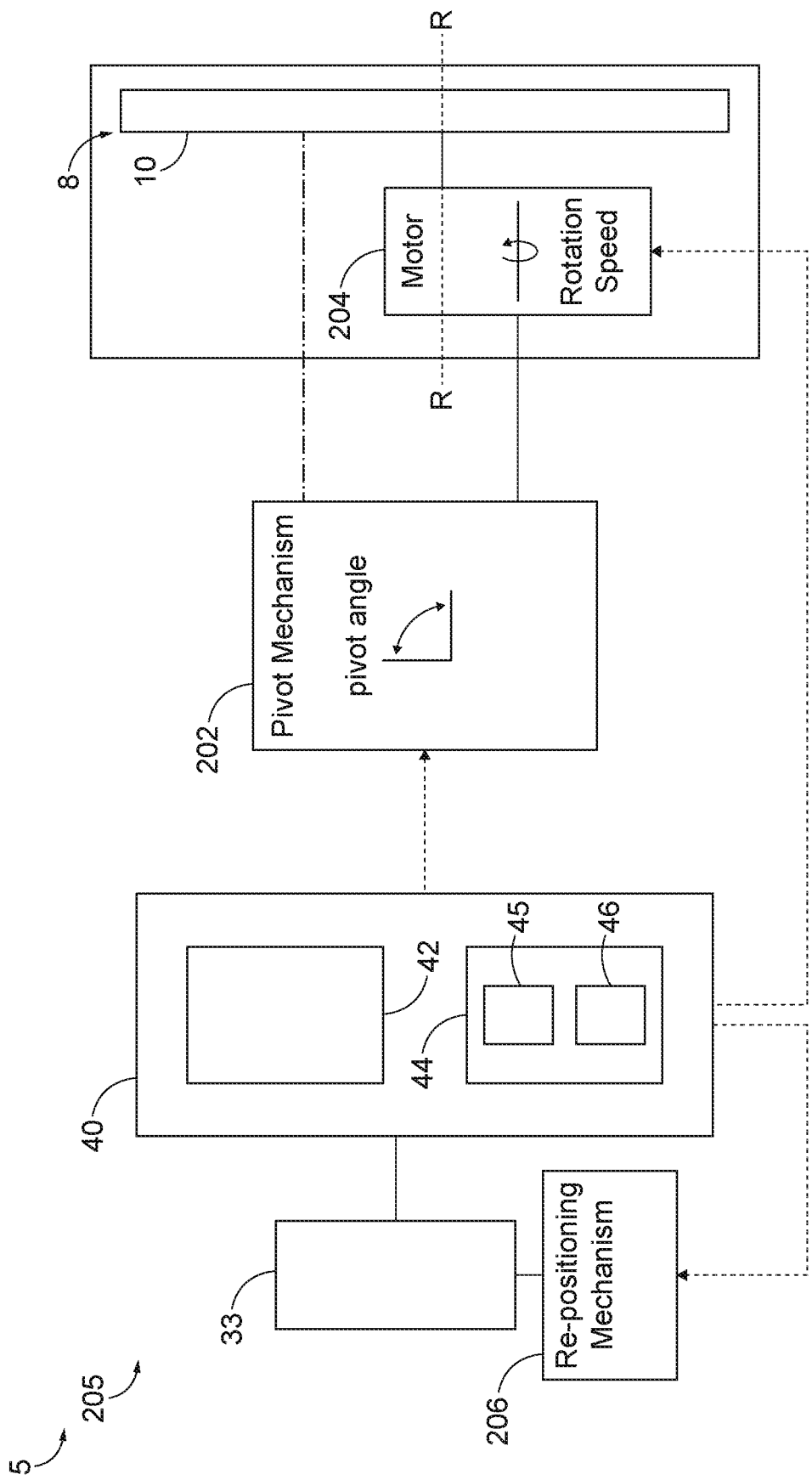
FIG. 2 is a schematic representation of example electrical systems of winged VTOL aircraft, according to the present disclosure.

In some examples, and as shown in FIG. 1, the one or more fixed-tilt rotors 16 are arranged in rows. In particular, the one or more fixed-tilt rotors 16 may be arranged in one or more rows behind at least one of the one or more wings 20. Although only two rows (the one or more forward fixed-tilt rotors 17 and the one or more aft fixed-tilt rotors 18) are shown in FIGS. 1-3, the aircraft 5 comprises additional rows of the one or more fixed-tilt rotors 16 in other examples.

In some examples, such as the examples shown in FIGS. 3 and 4, the one or more fixed-tilt rotors 16 comprise eight rotors, four of the one or more forward fixed-tilt rotors 17, and four of the one or more aft fixed-tilt rotors 18. However, in other examples, the one or more fixed-tilt rotors 16 comprise more or less than eight rotors and/or more or less than two rows of rotors. As one such example, the one or more fixed-tilt rotors 16 comprise only four of the one or more forward fixed-tilt rotors 17 and none of the one or more aft fixed-tilt rotors 18 (only one row of rotors). In another such example, the one or more fixed-tilt rotors 16 comprise twelve rotors, four of the one or more forward fixed-tilt rotors 17, four of the one or more aft fixed-tilt rotors 18, and an additional four rotors positioned behind the one or more aft fixed-tilt rotors 18, forming another row of rotors (for a total of three rows of fixed-tilt rotors). In yet a further such example, the one or more fixed-tilt rotors 16 comprise six of the one or more forward fixed-tilt rotors 17 and none of the one or more aft fixed-tilt rotors 18.

In some examples, the aircraft 5 includes the same number of rotors in each row, including the front row comprising the one or more tilt-adjustable rotors 10. Said another way, the one or more tilt-adjustable rotors 10 comprise the same number of rotors as the number of fixed-tilt rotors in a single row of the one or more fixed-tilt rotors 16. Thus, in such examples, when only one row of the one or more fixed-tilt rotors 16 is included in the aircraft 5 (either the one or more forward fixed-tilt rotors 17 or the one or more aft fixed-tilt rotors 18), the aircraft 5 includes the same number of the one or more tilt-adjustable rotors 10 as the one or more fixed-tilt rotors 16. However, in other examples, the aircraft includes different numbers of rotors in each row of the rotors 8.

The one or more wings 20 are fixed wings that do not tilt. Thus, when the fuselage 26 is included, the one or more wings 20 are fixedly coupled to the fuselage 26, and as such, do not tilt relative to the fuselage 26. In some examples, the one or more wings 20 are coupled to the fuselage 26 proximate a top of the fuselage 26 (relative to a direction of thrust generated by the one or more fixed-tilt rotors 16). In particular, the one or more wings 20 are coupled to the fuselage 26 near the top of the fuselage 26 in such examples, to accommodate the door 27, and to permit unobstructed access to the fuselage 26 via the door 27 for passengers, cargo, and crew. Thus, in some such examples, the door 27 is positioned below the one or more wings 20. However, in other examples, the door 27 and the one or more wings 20 are coupled to the fuselage 26 at other relative locations. As one such example, the one or more wings 20 are coupled to the fuselage 26 in-between the top and the bottom of the fuselage 26 (e.g., near a middle of the fuselage 26), and the door 27 is included next to (behind and/or in front of) the one or more wings 20.

In some examples, the one or more wings 20 comprise a single pair of wings, one wing on the right side of the aircraft 5, and one wing on the left side of the aircraft 5. However, in other examples, such as the examples shown in FIGS. 3 and 4, the one or more wings 20 comprise a forward set of wings 22 and an aft set of wings 24. In yet further examples, the one or more wings 20 comprise additional sets of wings (i.e. more than two sets of wings). The aft set of wings 24 are positioned behind the forward set of wings 22, more proximate the rear 38 of the aircraft 5.

In some examples, at least one of the one or more fixed-tilt rotors 16 is positioned between the forward set of wings 22 and the aft set of wings 24. For example, as shown in FIGS. 3 and 4, four of the one or more forward fixed-tilt rotors 17 are positioned between the forward set of wings 22 and the aft set of wings 24. Additionally or alternatively, at least one of the one or more fixed-tilt rotors 16 is positioned behind the aft set of wings 24. For example, as shown in FIGS. 3 and 4, four of the one or more aft fixed-tilt rotors 18 are positioned behind the aft set of wings 24.

In some examples, the door 27 is included between the forward set of wings 22 and the aft set of wings 24. In other examples, at least a portion of the door 27 is included below the forward set of wings 22, as schematically and optionally illustrated in the example of FIG. 1.

In some examples, the aircraft 5 comprises a tail 34. In some such examples, such as the examples shown in FIGS. 3 and 4, the tail 34 is not directly coupled to the fuselage 26, and instead is spaced away from (e.g., behind) the fuselage 26. In some such examples, the tail 34 is coupled to the fuselage 26 via one or more mechanical connections, such as via one or more support elements 28.

However, in other examples, the aircraft 5 does not include the tail 34. As explained above, because the one or more tilt-adjustable rotors 10 may be adjusted (e.g., tilted) to accomplish yaw control, the tail and concomitant rudder may be omitted from the aircraft 5, in some examples. As such, a reduction in the cost, complexity, weight (and therefore fuel consumption) is achieved in examples where the tail 34 is omitted.

In some examples, at least one of the one or more wings 20 and/or the optional tail 34 includes one or more flight control surfaces 25. When included, the one or more flight control surfaces 25 are configured to adjust the orientation (e.g., yaw, pitch, and/or roll) of the aircraft 5. As one example, the one or more flight control surfaces 25 comprise ailerons configured to adjust the roll of the aircraft 5. As another example, the one or more flight control surfaces 25 additionally or alternatively comprise a rudder configured to adjust the yaw of the aircraft 5. In yet another example, the one or more flight control surfaces 25 additionally or alternatively comprise elevators configured to adjust the pitch of the aircraft 5. In yet further examples, the one or more wings 20 additionally or alternatively comprise flaps configured to increase the lift of the one or more wings and/or spoilers configured to decrease the lift of the one or more wings 20.

In some examples, the aircraft 5 comprises one or more support elements 28 configured to support at least one of the rotors 8. In particular, the one or more support elements 28 are configured to secure the rotors 8 to the one or more wings 20. Thus, when included, the one or more support elements are coupled to at least one of the one or more wings 20 and at least one of the rotors 8 to secure the at least one of the rotors 8 to the at least one of the one or more wings 20. The one or more support elements 28 comprise one or more of booms, spars, beams, or other mechanical support structures that are strong enough to support the weight of the rotors 8 and their associated actuators (e.g., motors, tilt mechanisms, etc.). Thus, in such examples, rather than coupling directly to the one or more wings 20, the rotors 8 instead couple to the one or more support elements 28, which in turn couple to the one or more wings 20. In examples where the rotors 8 couple to the one or more support elements 28, the one or more tilt-adjustable rotors 10 are configured to selectively tilt relative to the one or more support elements 28. Further, the one or more fixed-tilt rotors 16 are fixed relative to the one or more support elements 28 and are not configured to tilt relative to the one or more support elements 28.

In some examples, the one or more support elements 28 extend in a lengthwise direction along the aircraft 5, substantially parallel to the longitudinal axis 376 and substantially orthogonal to the one or more wings 20. That is, the one or more support elements 28 extend front-to-back relative to the aircraft 5. Because of this lengthwise orientation, the one or more support elements 28 are only configured to support one of the rotors 8 in each row of the rotors 8, in some such examples. Thus, in some such examples, the number of the one or more support elements 28 is equal to the number of rotors in each row of the rotors 8. One such example is shown in FIGS. 3 and 4, in which the aircraft 5 comprises four of the rotors 8 in each row, and thus four of the one or more support elements 28. Further, because the examples shown in FIGS. 3 and 4 comprise three rows of rotors 8, each of the one or more support elements 28 supports three of the rotors 8: one of the one or more tilt-adjustable rotors 10, one of the one or more forward fixed-tilt rotors 17, and one of the one or more aft fixed-tilt rotors 18.

In some examples, the one or more support elements 28 are cross-linked and/or otherwise interconnected to provide increased mechanical stability. In yet further examples, the one or more support elements 28 are forked to support more than one rotor in a given row of the rotors 8. For example, one or more of the one or more support elements 28 comprises a two-prong forked front end that is configured to support two of the one or more tilt-adjustable rotors 10.

In some examples, such as the examples shown in FIGS. 3 and 4, the one or more support elements 28 span the distance between the forward set of wings 22 and the aft set of wings 24, and extend beyond the forward set of wings 22 and the aft set of wings 24 along the longitudinal axis 376 (i.e. along a length of the aircraft 5). In particular, in some such examples, the one or more support elements 28 extend forward of the forward set of wings 22 and are coupled to the one or more tilt-adjustable rotors 10 in this most forward section, and extend aft of the aft set of wings 24 are coupled to the one or more aft fixed-tilt rotors 18 in this most aft section.

In some examples, the one or more support elements 28 are coupled to both the forward set of wings 22 and the aft set of wings 24. However, in other examples, the one or more support elements 28 are only coupled to one of the forward set of wings 22 or the aft set of wings 24. In some such examples, the one or more tilt-adjustable rotors 10 are coupled to a front end of the one or more support elements 28, and the one or more fixed-tilt rotors 16 are coupled to the one or more support elements 28 behind at least one of the one or more wings 20. In particular, when the one or more fixed-tilt rotors 16 comprise more than one row of rotors (as in the examples of FIGS. 3 and 4), the one or more forward fixed-tilt rotors 17 are coupled to the one or more support elements 28 between the forward set of wings 22 and the aft set of wings 24, and the one or more aft fixed-tilt rotors 18 are coupled to the one or more support elements 28 behind the aft set of wings 24.

In some examples, the one or more support elements 28 are spaced away from the fuselage 26. That is, the one or more support elements 28 are separated from the fuselage 26 by a gap and do not directly physically contact the fuselage 26 in such examples.

In some examples, the one or more support elements 28 comprise one or more inner support elements 30 and one or more outer support elements 32. When included, the one or more inner support elements 30 are positioned more proximate the fuselage 26 than the one or more outer support elements 32. As just one such example, such as the examples shown in FIGS. 3 and 4, the one or more support elements 28 comprise two of the one or more inner support elements 30 (one on each side of fuselage 26) and two of the one or more outer supports elements 32 (one on each side of the fuselage 26). However, in other examples, the aircraft 5 includes different numbers of the one or more inner support elements 30 and the one or more outer support elements 32.

In some examples, at least one of the one or more support elements 28 couples to the tail 34 to provide mechanical support to the tail 34. In one such example, such as the examples shown in FIGS. 3 and 4, the one or more inner support elements 30 couple to the tail 34 to at least partially hold and support the tail 34 (e.g., to couple the tail 34 to the fuselage 26). Thus, the tail 34 is at least partially coupled to the fuselage 26 via the one or more support elements 28.

The support elements 28 provide increased rigidness to the airframe 19 because they are tied to both the wings 20 and the rotors 8. That is, the support elements 28 provide mechanical support to both the wings 20 and the rotors 8. In examples where both the forward set of wings 22 and the aft set of wings 24 are included, the support elements 28 provide increased rigidness to the airframe 19 by coupling to both the forward set of wings 22 and the aft set of wings 24.

In some examples, the aircraft 5 additionally comprises one or more power sources 33 that are configured to supply electrical power to various actuators of the aircraft 5, such as the electric motors that spin the rotors 8 to generate thrust. Thus, the one or more power sources 33 may be referred to herein as "rotor power sources 33." Additionally or alternatively, the one or more power sources 33 are configured to supply electrical power to the tilt mechanisms that tilt the one or more tilt-adjustable rotors 10 and/or the flight control actuators that adjust the one or more flight control surfaces 25. In some examples, the power sources 33 comprise batteries, such as rechargeable (e.g., lithium ion) batteries. In some such examples where the power sources 33 only comprise batteries, the aircraft 5 is a fully electric aircraft. However, in other examples, the power sources 33 additionally comprise liquid fuel (e.g., petroleum-based jet fuel). In such examples, the aircraft 5 is a hybrid electric aircraft 5 that is powered by both electric batteries and fuel.

In some examples, the one or more power sources 33 are positioned exterior to the one or more wings 20 and/or the fuselage 26, and are coupled to the one or more wings 20, in some examples.

Specifically, in some such examples, the one or more power sources 33 are coupled to the one or more support elements 28, which as described above, are in turn coupled to the one or more wings 20. In some such examples, the one or more power sources 33 are coupled to a bottom of the one or more support elements 28, beneath (with respect to the direction of thrust of the one or more fixed-tilt rotors 16) the one or more support elements 28 and the one or more wings 20, and/or within the support elements 28. In some such examples, the one or more power sources 33 are additionally or alternatively only coupled to the one or more inner support elements 30, and not to the one or more outer support elements 32, as shown in the examples of FIGS. 3 and 4. However, in other examples, the one or more power sources 33 are coupled to all of the one or more support elements 28.

In some examples, the one or more power sources 33 are only coupled to the one or more wings 20 and are not directly coupled to, or included within, the fuselage 26. Thus, in such examples, the one or more power sources 33 are positioned away from the fuselage 26 and are only coupled to the fuselage 26 indirectly via the coupling to the one or more wings 20. However, in other examples, the one or more power sources 33 are included exterior to the fuselage 26 (e.g., coupled to the one or more wings 20 away from the fuselage 26) and interior to the fuselage 26.

By including at least one of the one or more power sources 33 exterior to the fuselage 26 (and in particular beneath the one or more wings 20 and/or the one or more support elements 28) an increase in cooling efficiency and accessibility of the one or more power sources 33 is achieved. In particular, by positioning the one or more power sources 33 exterior to the fuselage 26 and below the one or more wings 20, the one or more power sources 33 are more exposed to ambient air, and thus are cooled to a greater degree by the ambient air than power sources included within the fuselage. In some examples, the ambient air itself is sufficient to provide a desired level of cooling for the one or more power sources 33, thus eliminating the need for cooling fans or other active cooling mechanisms. Thus, the cost and complexity of the aircraft 5 is reduced by positioning the one or more power sources 33 exterior to the fuselage 26.

Further, by positioning the one or more power sources 33 below the one or more wings 20, and specifically below the one or more support elements 28, the one or more power sources 33 are more accessible to ground personnel. Thus, ground personnel may more easily and quickly replace, re-charge, and/or re-fuel the one or more power sources 33 as compared to other aircraft that include the batteries inside the fuselage 26.

In still further examples, the one or more power sources 33 are configured to be selectively repositioned forward and aft (along the longitudinal axis 376). In particular, the one or more power sources 33 are configured to be selectively repositioned forward and aft relative to the one or more support elements 28 and/or the one or more wings 20. In some examples, the one or more power sources 33 are selectively repositioned forward or aft to adjust a center of gravity of the aircraft 5.

To perform the repositioning, the aircraft 5 comprises one or more power source repositioning actuators (e.g., mechanical, hydraulic, pneumatic, and/or electronic actuators), in some examples, that are controlled either manually (directly by a user) or electronically (by a controller) to reposition the one or more power sources 33. In yet further examples, the aircraft 5 does not comprise any repositioning actuators for the one or more power sources 33, and the one or more power sources 33 are instead repositioned by hand by a user without the aid of any actuators. In some examples, the repositioning is performed responsive to user input. However, in other examples, the repositioning is performed autonomously according to one or more control schemes (e.g., a feedback loop). As one such example, a controller may adjust the position of the one or more power sources 33 based on one or more of takeoff weight, aircraft center of gravity, fuel consumption, passenger distribution, etc.

Thus, the aerodynamic stability of the aircraft 5 is increased by including repositionable power sources. That is, by configuring the one or more power sources to be selectively repositioned forward or aft, the aircraft may be more effectively balanced than other aircraft comprising fixed-position power sources, thus ensuring a safer, smoother ride.

In some examples, the aircraft 5 additionally comprises a controller 40 that is programmed to control various actuators of the aircraft 5 (e.g., the electric motors that power the rotors 8, the tilt mechanisms that tilt the one or more tilt-adjustable rotors 10, the actuators that adjust the one or more flight control surfaces 25, the actuators that re-position the one or more power sources 33, etc.). When included, the controller 40 includes a memory unit 44 and a processing unit 42. The memory unit 44 stores computer-readable instructions (the software) and the processing unit 42 executes the stored computer-readable instructions to perform the various computing functions responsive to various inputs, such as to selectively tilt the one or more tilt-adjustable rotors 10 responsive to a desired change between hovering and cruising.

When included, the memory unit 44 comprises non-volatile (also referred to herein as "non-transitory") memory 46 (e.g., ROM, PROM, and EPROM) and/or volatile (also referred to herein as "transitory") memory 45 (e.g., RAM, SRAM, and DRAM), in some examples. The processing unit 42 comprises integrated circuits including one or more of field-programmable gate arrays (FPGAs), application-specific integrated circuits (ASICs), digital signal processors (DSPs), microprocessors, microcontrollers, programmable array logic (PALs), and complex programmable logic devices (CPLDs).

As will be described in greater detail below, the controller 40 is programmed to execute various methods, such as methods schematically represented in FIG. 5. In particular, the controller 40 is programmed to one or more of: selectively tilt the one or more tilt-adjustable rotors 10, selectively adjust the thrust generated by one or more of the rotors 8, and selectively reposition the one or more power sources 33.

FIG. 2 schematically shows the controller 40 included in an example electrical system 205 of the aircraft 5. In particular, FIG. 2 shows an example of how the one or more power sources 33 and the controller 40 are electrically coupled to some of the various actuators (e.g., the tilt mechanisms of the rotors 8) of the aircraft 5 to control operation of the actuators.

As schematically illustrated in FIG. 2, electrical system 205 is an example of an electrical system that may be included in the aircraft 5. Electrical connections between components are shown in dashed lines, and mechanical connections between components are shown in solid lines. Electrical system 205 comprises the one or more power sources 33, the controller 40, and the various actuators that are controlled by the controller 40. In the example of FIG. 2, only a tilt mechanism 202 configured to tilt the one or more tilt-adjustable rotors 10, a motor 204 configured to power (e.g., spin) the rotors 8 to generate thrust, and a re-positioning mechanism 206 configured to re-position the one or more power sources 33, are shown. However, the electrical system 205 comprises additional actuators (e.g., actuators for adjusting the one or more flight control surfaces 25), in other examples.

The tilt mechanism 202 is configured to selectively tilt at least one of the one or more tilt-adjustable rotors 10. As described above, the electrical system 205 comprises multiple tilt mechanisms in some examples. For example, the electrical system 205 comprises one tilt mechanism 202 for each of the one or more tilt-adjustable rotors 10, such that each of the one or more tilt-adjustable rotors 10 has its own dedicated tilt mechanism 202. Thus, the tilt mechanism 202 is configured to tilt at least one of the one or more tilt-adjustable rotors 10 between the first position 13 and the second position 14 responsive to command signals received from the controller 40. The tilt mechanism 202 comprises one or more of an electromechanical, pneumatic, and hydraulic tilt actuator that is configured to be electronically controlled by the controller 40. As examples, the tilt mechanism 202 may comprise one or more of a ring-and-pinion, piston-and-bell crank, ball-screw, harmonic drive, multi-link geometry and/or harmonic drive gearbox.

As shown in FIG. 2, in some examples, the tilt mechanism 202 is configured to tilt both the motor 204 and one of the one or more tilt-adjustable rotors 10. That is, both the motor 204 and the one of the one or more tilt-adjustable rotors 10, which the motor 204 is configured to spin, are tilted together. However, in other examples, as is shown by the dash-dot line in FIG. 2, the tilt mechanism 202 is configured to only tilt the one of the one or more tilt-adjustable rotors 10 and is not configured to tilt the motor 204.

The motor 204 is configured to selectively spin (e.g., power) at least one of the rotors 8 about the axis of rotation (R-R) to generate thrust. As described above, the electrical system 205 comprises multiple motors in some examples. For example, the electrical system 205 comprises one motor 204 for each of the rotors 8, such that each of the rotors 8 has its own dedicated motor 204. However, in other examples, a single motor 204 is configured to power more than one of the rotors 8.

The re-positioning mechanism 206 is configured to selectively re-position the one or more power sources 33 to adjust a center of gravity of the aircraft 5. The re-positioning mechanism 206 comprises a linear actuator, or other actuator configured to move the one or more power sources 33 back and forth along a single axis (e.g., longitudinal axis 376), in some examples. The re-positioning mechanism 206 comprises one or more of an electromechanical, pneumatic, and/or hydraulic linear actuator that is configured to be electronically controlled by the controller 40. As one example, the re-positioning mechanism 206 comprises a ball-screw. As another example, the re-positioning mechanism 206 comprises a loop and pulley system.

The controller 40 is in electrical communication (e.g., wired and/or wireless communication) with the one or more power sources 33, the tilt mechanism 202, the motor 204, and the re-positioning mechanism 206. Electrical connections between components are shown in dashed lines in FIG. 2. The controller 40 receives electrical power from the one or more power sources 33, and distributes the electrical power provided by the one or more power sources 33 to the tilt mechanism 202, the motor 204, and the re-positioning mechanism 206 according to a control scheme. In particular, the method described below in FIG. 5, describes an example control scheme that may be utilized by the controller 40 to regulate the amount of electrical power supplied to one or more of the tilt mechanism 202, the motor 204, and the re-positioning mechanism 206.

More generally, the controller 40 sends command signals (e.g., digital signals) to one or more of the tilt mechanism 202, the motor 204, and the re-positioning mechanism 206 to adjust operation thereof. As described above, the controller 40 is programmed to perform various actions (e.g., control the actuators described above) based on received input. In particular, the controller 40 includes computer-readable instructions stored in non-transitory memory 46, wherein the computer-readable instructions comprise instructions for controlling one or more of the tilt mechanism 202, the motor 204, and the re-positioning mechanism 206 based on received input. The processing unit 42 is configured to execute the stored computer-readable instructions to control operation of one or more of the tilt mechanism 202, the motor 204, and the re-positioning mechanism 206.

FIGS. 3 and 4 show an illustrative, non-exclusive example of the aircraft 5. Where appropriate, the reference numerals from the schematic illustrations of FIGS. 1 and 2 are used to designate corresponding parts of the examples of FIGS. 3 and 4; however, the example of aircraft 5 of FIGS. 3 and 4 is non-exclusive and does not limit the aircraft 5 to the illustrated embodiment of FIGS. 3 and 4. That is, the aircraft 5 is not limited to the specific embodiment of FIGS. 3 and 4, and the aircraft 5 may incorporate any number of the various aspects, configurations, characteristics, properties, etc. of the aircraft 5 that are illustrated in and discussed with reference to the schematic representations of FIGS. 1 and 2 and/or the embodiment of FIGS. 3 and 4, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the example of FIGS. 3 and 4; however, it is within the scope of the present disclosure that the previously discussed features, variants, etc. may be utilized with the examples of FIGS. 3 and 4.

FIGS. 3 and 4 show isometric side views of aircraft that are examples of aircraft 5 in different flying configurations. Specifically, FIG. 3 shows an example aircraft 305 in an example hover mode 350 configured for vertical flight, and FIG. 4 shows the example aircraft 305 in an example cruise mode 450 configured for horizontal flight. The FIGS. 3 and 4 illustrate examples of how the rotors 8 are operated in the two modes, and specifically how the one or more tilt-adjustable rotors 10 are tilted differently in the two modes.

As shown in FIG. 3, example aircraft 305 is an example of aircraft 5 in an example hover mode 350. In the example hover mode 350 shown in FIG. 3, the one or more tilt-adjustable rotors 10 are tilted to the first position 13 to generate thrust in a vertical direction. Further, in the example of FIG. 3, the first position 13 is the horizontal position in which an axis of rotation (R-R) of the one or more tilt-adjustable rotors 10 is orthogonal to the pitch of the example aircraft 305. The one or more fixed-tilt rotors 16 are also positioned such that their axis of rotation is orthogonal to the pitch of the example aircraft 305. Thus, all of the rotors 8 are parallel in FIG. 3.

Because the example aircraft 305 has a pitch of approximately zero (the longitudinal axis of the example aircraft 305 is substantially parallel to the longitudinal axis 376) in FIGS. 3 and 4, the axis of rotation (R-R) of the one or more tilt-adjustable rotors 10 is orthogonal to longitudinal axis 376 and parallel to vertical axis 372 (and thus parallel to gravity). As mentioned above, the pitch of aircraft refers to the angle between the aircraft's longitudinal axis (e.g., front 36 of the example aircraft 305) and the longitudinal axis 376. Thus, changes in pitch refer to rotation of the aircraft 5 about the transverse axis 374, relative to the longitudinal axis 376.

Axis system 370 is shown in FIGS. 3 and 4 for reference. The three axes are orthogonal to one another. The vertical axis 372 is antiparallel to gravity, and the transverse axis 374 and the longitudinal axis 376 define a plane (e.g., the horizon) that is orthogonal to gravity and parallel to level ground. Rotation about the transverse axis 374 is referred to as pitch, and rotation about the longitudinal axis is referred to as roll. Rotation about the vertical axis 372 is referred to as yaw. In FIGS. 3 and 4, the aircraft 5 is substantially parallel to the horizon and thus has approximately zero pitch and zero roll.

In the example hover mode 350 shown in FIG. 3, all of the rotors 8 are powered on to generate thrust. Because the rotors 8 are all oriented with their axis of rotation parallel to gravity, and because the rotors 8 face up (antiparallel to gravity), the rotors 8 generate thrust in a positive vertical direction, antiparallel to gravity. Thus, in the example hover mode 350 of FIG. 3, the example aircraft 305 is configured for vertical flight, and a speed of the example aircraft 305 in the vertical direction is controlled by adjusting the speed (and thus the amount of thrust produced by) the rotors 8.

In the examples of FIGS. 3 and 4, the aircraft 5 optionally comprises three rows of four rotors. Thus, the example aircraft 305 comprises four of the one or more tilt-adjustable rotors 10, four of the one or more forward fixed-tilt rotors 17 and four of the one or more aft fixed-tilt rotors 18. Further, the example aircraft 305 comprises one or more wheels 308 configured to support the example aircraft 305 on the ground. The fuselage 26 also comprises a cockpit windshield 306 configured to provide the crew with a view of the outside environment, in some examples.

As seen in FIG. 4, example aircraft 305 is shown in an example cruise mode 450. In the example cruise mode 450 shown in FIG. 4, the one or more tilt-adjustable rotors 10 are tilted to the second position 14 to generate thrust in a horizontal direction. In the example of FIG. 4, the second position 14 is the vertical position in which the axis of rotation (R-R) of the one or more tilt-adjustable rotors 10 is parallel to the pitch of the example aircraft 305. The one or more fixed-tilt rotors 16 remain in the fixed position of FIG. 3, such that their axis of rotation is orthogonal to the pitch of the example aircraft 305 in the cruise mode 450. Thus, the axis of rotation of the one or more tilt-adjustable rotors 10 is orthogonal to the axis of rotation of the one or more fixed-tilt rotors 16 in FIG. 4.

Because the example aircraft 305 has a pitch of approximately zero (the longitudinal axis of the example aircraft 305 is substantially parallel to the longitudinal axis 376) in FIGS. 3 and 4, the axis of rotation (R-R) of the one or more tilt-adjustable rotors 10 is parallel to longitudinal axis 376 and orthogonal to vertical axis 372 (and thus orthogonal to gravity). Further, in the example cruise mode 450 shown in FIG. 4, only the one or more tilt-adjustable rotors 10 are powered on to generate thrust. The one or more fixed-tilt rotors 16 are powered off.

Thus, because the one or more tilt-adjustable rotors 10 are oriented with their axis of rotation orthogonal to gravity, and because the one or more tilt-adjustable rotors 10 face forward, the one or more tilt-adjustable rotors 10 generate thrust in a forward direction (positive longitudinal direction). Thus, in the example cruise mode 450 of FIG. 4, the example aircraft 305 is configured for horizontal flight, and a speed of the example aircraft 305 in the horizontal direction is controlled by adjusting the speed (and thus the amount of thrust produced by) the one or more tilt-adjustable rotors 10.

Figure 5:
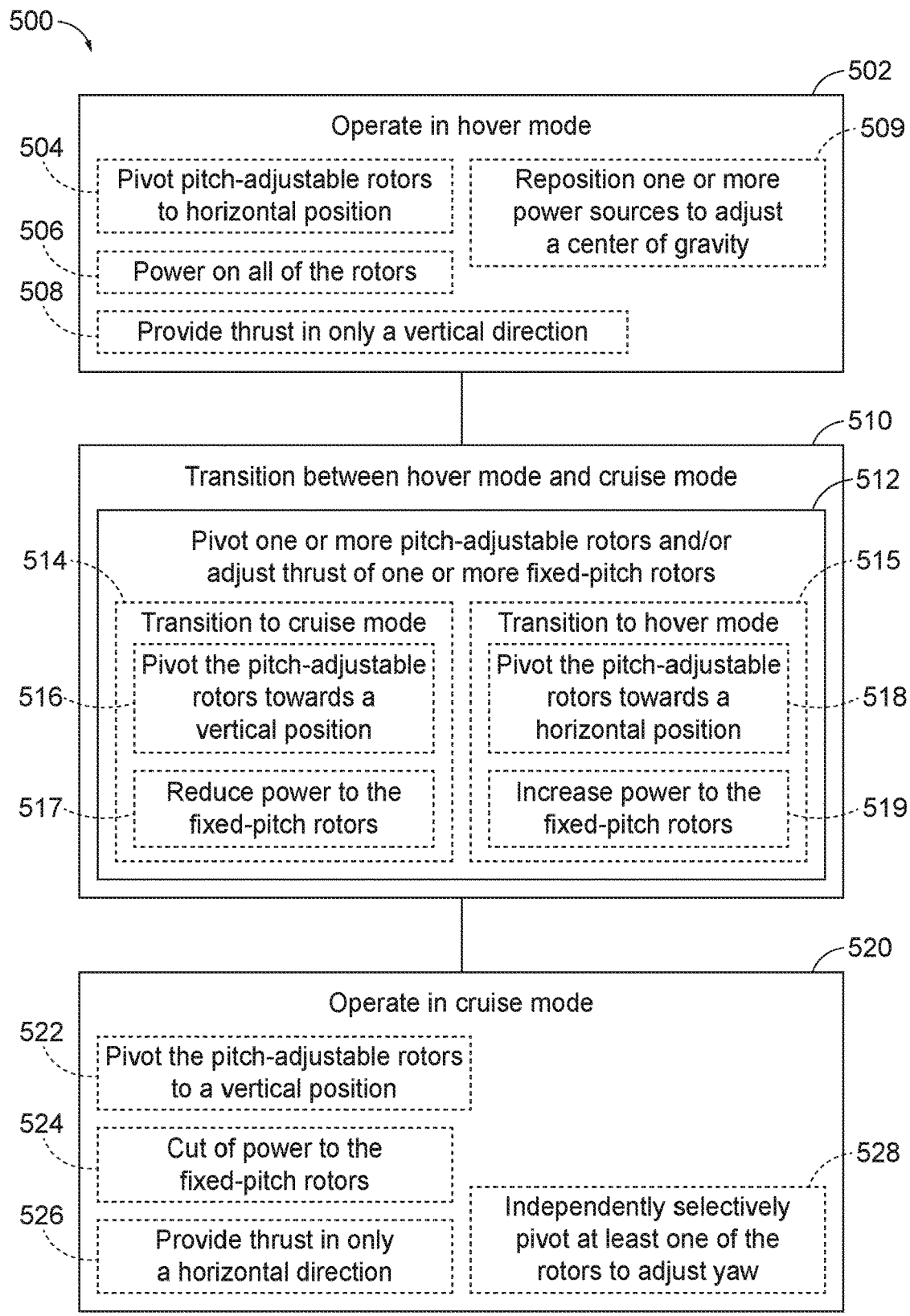
FIG. 5 is a flowchart schematically representing methods for enhancing operation of a winged VTOL aircraft, according to the present disclosure.

FIG. 5 schematically provides a flowchart that represents illustrative, non-exclusive examples of methods according to the present disclosure. In FIG. 5, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 5 are not limiting and other methods and steps are within the scope of the present disclosure, including methods having greater than or fewer than the number of steps illustrated, as understood from the discussions herein.

In some examples, controller 40, described above, is programmed to perform one or more of the methods and steps illustrated in FIG. 5. In particular, instructions for performing the various steps and/or methods described in FIG. 5 are stored as computer-readable instructions in the non-transitory memory 46 of the controller 40. The processing unit 42 of the controller 40 is configured to execute the computer-readable instructions to perform the one or more steps and methods described in FIG. 5.

As seen in FIG. 5, a method 500 includes operating in a hover mode at 502, operating in a cruise mode at 520, and transitioning between the hover mode and the cruise mode at 510. Methods 500 may be described as methods of operation an aircraft, methods of enhancing operation of an aircraft, and/or methods of improving operation of an aircraft.

In one example, a VTOL aircraft (e.g., aircraft 5) operates in the hover mode during take-off and landing. Thus, in the hover mode, the VTOL aircraft is configured to fly vertically, not horizontally. As such, the operating in the hover mode at 502 optionally comprises one or more of: tilting one or more tilt-adjustable rotors (e.g., one or more tilt-adjustable rotors 10) to the horizontal position at 504, powering on all rotors (e.g., rotors 8) at 506, and providing thrust in only a vertical direction (antiparallel to gravity) at 508. As explained above, the horizontal position is a position where the axis of rotation of the rotors is antiparallel to gravity. However, in other examples, the rotors are adjusted to a position that is at an angle with respect to gravity and thus lift is generated in both vertical and horizontal directions (not antiparallel to gravity).

The operating in the hover mode at 502 may be conducted responsive to user inputs via a user input mechanism (e.g., joystick, throttle, touchscreen, button, etc.) and/or may be automated (e.g., cruise control) responsive to a start-up sequence which may be activated by a user (e.g., pressing of a start button).

However, in some examples, not all of the rotors are powered on while operating in the hover mode at 502. In some such examples, only some of the rotors are powered on to conserve energy and/or reduce vertical speed of the aircraft. As one such example, at least one of the one or more tilt-adjustable rotors is powered off in the hover mode.

In other examples, the operating in the hover mode at 502 additionally comprises adjusting the amount of vertical thrust generated by the rotors by adjusting an amount of power supplied to the motors (e.g., motor 204) of the rotors. In particular, the power supplied to the rotors may be adjusted to adjust the vertical speed of the aircraft. In other examples, the operating in the hover mode at 502 comprises providing maximum power to all of the rotors and/or providing maximum power to all of the one or more fixed-position rotors.

In further examples, the operating in the hover mode at 502 additionally or alternatively comprises repositioning one or more power sources (e.g., one or more power sources 33) at 509 to adjust a center of gravity of the aircraft. In particular, the one or more power sources may be repositioned before takeoff to adjust the center of gravity of the aircraft. However, in other examples, the repositioning is performed mid-flight, after takeoff. In some examples, the repositioning comprises moving the one or more power sources forward or aft (longitudinally) relative to one or more of: one or more wings (e.g., one or more wings 20), one or more support elements (e.g., one or more support elements 28), and a fuselage (e.g., fuselage 26). A technical effect of increasing the stability and energy efficiency of the aircraft is achieved by adjusting the center of gravity of the aircraft via the repositioning of the power sources.

In one example, a VTOL aircraft (e.g., aircraft 5 described in FIGS. 1-4) operates in the cruise mode when flying horizontally (not during take-off and landing). As such, the operating in the cruise mode at 520 optionally comprises one or more of: tilting the one or more tilt-adjustable rotors to the vertical position at 522, cutting off power to one or more fixed-tilt rotors (e.g., one or more fixed-tilt rotors 16) at 524, and providing thrust in only a horizontal direction (orthogonal to gravity) at 526. As explained above, the vertical position is a position in which the axis of rotation of the tilt-adjustable rotors is orthogonal to gravity and parallel to the horizon. However, in other examples, the operating in the cruise mode at 520 comprises adjusting the tilt-adjustable rotors to a position that is at a slight angle with respect to the horizon (not orthogonal to gravity). In this way, thrust is provided in both horizontal and vertical directions during the cruise mode, in some examples.

Further, the cutting off power to the one or more fixed-tilt rotors at 524 comprises stopping the flow of electrical power to the motors that power/spin the one or more fixed-tilt rotors, in some examples. Thus, the one or more fixed-tilt rotors stop spinning and come to rest during the cruise mode in examples where power is cut off to the fixed-tilt rotors. However, in other examples, only some of the one or more fixed-tilt rotors are powered off when operating in the cruise mode at 520. In still further examples, the power supplied to the one or more fixed-tilt rotors is reduced, but is not completely cut off when operating in the cruise mode 520. Thus, the thrust generated by the one or more fixed-tilt rotors is reduced in the cruise mode, and in some examples, the one or more fixed-tilt rotors are powered off so that they do not generate any thrust. However, in other examples, at least one of the one or more fixed-tilt rotors is powered on during to the cruise mode to generate lift in the vertical direction.

In some examples, the operating in the cruise mode at 520 additionally or alternatively comprises differentially tilting at least one of the tilt-adjustable rotors to adjust the yaw of the aircraft at 528. In particular, by independently selectively tilting at least one of the tilt-adjustable rotors on only one side of the aircraft away from the vertical position towards the horizontal position, the yaw of the aircraft is adjusted.

The operating in the cruise mode at 520 may be conducted responsive to user inputs via a user input mechanism (e.g., joystick, throttle, touchscreen, button, etc.) and/or may be automated (e.g., cruise control) responsive to reaching one or more threshold parameters (e.g., threshold altitude) and/or responsive to a cruise sequence activated by a user (e.g., user pressing of a cruise button).

The transitioning between the hover mode and the cruise mode at 510 comprises tilting the one or more tilt-adjustable rotors and/or adjusting the thrust of the one or more fixed-tilt rotors at 512. As described above, the one or more tilt-adjustable rotors are positioned forward of the one or more wings and the one or more fixed-tilt rotors are positioned behind at least one of the one or more wings, in some examples. Thus, in such examples, the tilting the one or more tilt-adjustable rotors comprises tilting only the rotors positioned forward of the one or more wings and maintaining a fixed tilt angle of (i.e., not tilting) the fixed-tilt rotors positioned behind the one or more wings.

By tilting only the one or more tilt-adjustable rotors, a technical effect of reducing the total force required to tilt the one or more tilt-adjustable rotors is achieved relative to systems that tilt all of the rotors. Thus, tilting only the one or more tilt-adjustable rotors enables more facile, effortless transitions between the hover and cruise modes that reduces energy consumption.

In some examples, all of the one or more tilt-adjustable rotors are tilted simultaneously and/or to the same degree when transitioning between the hover mode and the cruise mode at 510. In some such examples, the one or more tilt-adjustable rotors are tilted at substantially the same rate. However, in other examples, the one or more tilt-adjustable rotors are tilted at different rates. In still further examples, the one or more tilt-adjustable rotors are tilted at different times and/or to different degrees when transitioning between the cruise mode and the hover mode at 510. That is, the one or more tilt-adjustable rotors are differentially tilted when transitioning between the hover mode and the cruise mode at 510.

In some examples, the rate at which the one or more tilt-adjustable rotors are tilted is adjusted based on one or more aircraft operating conditions (e.g., wind speed, aircraft velocity, and/or aircraft acceleration). Further, in examples, where the one or more tilt-adjustable rotors are not tilted simultaneously when transitioning between the two modes, the sequencing of the tilting of different rotors (i.e. the delay between the tilting of different rotors) may be adjusted based on one or more aircraft operating conditions (e.g., aircraft pitch, aircraft altitude, wing speed, wind direction, etc.). That is, in some such examples, one or more of: some of the one or more tilt-adjustable rotors are tilted before others, some of the one or more tilt-adjustable rotors are only partially tilted while other tilt-adjustable rotors are fully tilted to the other orthogonal position, etc.

The transitioning between the hover mode and the cruise mode optionally comprises one or more of transitioning to the cruise mode at 514, and transitioning to the hover mode at 515. The transitioning to the cruise mode at 514 comprises tilting the one or more tilt-adjustable rotors towards the vertical position (i.e. away from the horizontal position). Thus, the method 500 at 516 comprises tilting the axis of rotation of the one or more tilt-adjustable rotors towards the pitch of the aircraft, away from the axis of rotation of the one or more fixed-tilt rotors. Conversely, when transitioning to the hover mode at 515, the method 500 comprises tilting the one or more tilt-adjustable rotors towards the horizontal position (i.e. away from the vertical position). Thus, the method 500 at 518 comprises tilting the axis of rotation of the one or more tilt-adjustable rotors towards the axis of rotation of the one or more fixed-tilt rotors and away from the pitch of the aircraft.

The transitioning to the cruise mode at 514 optionally comprises reducing power supplied to the one or more fixed-tilt rotors at 517. The reducing the power supplied to the one or more fixed-tilt rotors at 517 comprises reducing electrical power to the motors of the one or more fixed-tilt rotors to reduce the speed of the one or more fixed-tilt rotors, and thus reduce an amount of thrust generated by the one or more fixed-tilt rotors. In some examples, power to the one or more fixed-tilt rotors is evenly reduced. However, in other examples, the power is differentially reduced, such that some of the one or more fixed-tilt rotors are supplied with less power, and/or the power is reduced more quickly, than other rotors. Further, in some examples, the rate at which the power is reduced and/or the amount that the power is reduced may be adjusted based on aircraft operating conditions.

Conversely, the transitioning to the hover mode at 515 optionally comprises increasing power supplied to the one or more fixed-tilt rotors at 519. The increasing the power supplied to the one or more fixed-tilt rotors at 519 comprises increasing electrical power to the motors of the one or more fixed-tilt rotors to increase the speed of the one or more fixed-tilt rotors, and thus increase an amount of thrust generated by the one or more fixed-tilt rotors. In some examples, power to the one or more fixed-tilt rotors is evenly increased. However, in other examples, the power is differentially increased, such that some rotors are supplied with more power, and/or the power is increased more quickly, than other rotors. Further, in some examples, the rate at which the power is increased and/or the amount that the power is increased may be adjusted based on aircraft operating conditions.

In some examples, the power supplied to the one or more fixed-tilt rotors is maintained while the tilt-adjustable rotors are tilted (towards the vertical position when transitioning to the cruise mode, and towards the horizontal position when transitioning to the hover mode), and the power supplied to the fixed-tilt rotors is only adjusted once the tilt-adjustable rotors reach the desired position (either the vertical position when transitioning to the cruise mode or the horizontal position when transitioning to the cruise mode).

Thus, in some examples, the reducing the power to the one or more fixed-tilt rotors at 517 optionally comprises maintaining power while the one or more tilt-adjustable rotors are tilted towards the vertical position, and then cutting off power to the one or more fixed-tilt rotors responsive to the one or more tilt-adjustable rotors reaching the vertical position. Conversely, the increasing the power to the one or more fixed-tilt rotors at 519 optionally comprises maintaining power (e.g., keeping the rotors powered off) while the one or more tilt-adjustable rotors are tilted towards the horizontal position, and then increasing power to the one or more fixed-tilt rotors responsive to the one or more tilt-adjustable rotors reaching the horizontal position.

However, in other examples, the power to at least one of the one or more fixed-tilt rotors is adjusted while the one or more tilt-adjustable rotors are tilted between the horizontal and vertical positions. For example, the power to at least one of the one or more fixed-tilt rotors is reduced while the one or more tilt-adjustable rotors are tilted towards the vertical position at 516. Conversely, the power to at least one of the one or more fixed-tilt rotors is increase while the one or more tilt-adjustable rotors are tilted towards the horizontal position at 518.

However, maintaining some level of power (even if it is reduced power) to one or more of the one or more fixed-tilt rotors while tilting the one or more tilt-adjustable rotors during the transition between the hover mode and the cruise mode provides a technical effect of increasing the stability of the aircraft during the transition, thus making for a smoother transition. In particular, the spinning fixed-tilt rotors and the tilting tilt-adjustable rotors provide counterbalancing forces that minimize pitch fluctuations during the transition from hovering to cruising. In particular, during the transition from hovering to cruising, tilting the front row of rotors downwards produces a nose-down tendency in the aircraft. However, powering the fixed-tilt rotors during the transition provides an opposing nose-up tendency. Specifically, the spinning fixed-tilt rotors generate a flow field that convects towards the tail, causing a strong nose-up tendency. Thus, by powering on the one or more fixed-tilt rotors while tilting the one or more tilt-adjustable rotors, the pitch of the aircraft may be more stably maintained, thereby reducing unwanted fluctuations in the aircraft's pitch during the transition. In this way, the aircraft of the present disclosure provides a smoother transition from hovering to cruising than tilt-rotor aircraft that tilt all of their rotors.

Further, powering only some of the rotors (e.g., the one or more tilt-adjustable rotors) in the cruise mode saves energy as compared to other tilt-rotor aircraft that tilt all of their rotors. In other tilt-rotors aircraft, all of the rotors are tilted to the vertical position during cruising, and all of the rotors are therefore powered during the cruising. But, cruising may require less thrust than takeoff. By reducing power (e.g., powering off) to the one or more fixed-position rotors in the cruise mode, the aircraft of the present disclosure conserves energy during cruising while still meeting the lower thrust demands required during such cruising. Further, by tilting the one or more tilt-adjustable rotors to the horizontal position and powering all of the rotors (both the fixed-tilt and tilt-adjustable rotors) in the hover mode, the one or more tilt-adjustable rotors are not a parasitic loss during hovering because they may be used to provide additional vertical thrust. In this way, the aircraft saves energy during the cruise mode while increasing the maximum vertical thrust of the aircraft during hovering. Thus, the aircraft is just as capable during takeoff as other tilt-rotor aircraft, and is more energy efficient during cruising.

In some examples, power to the one or more tilt-adjustable rotors is maintained (e.g., not adjusted) while tilting the one or more tilt-adjustable rotors when transitioning between the hover mode and the cruise mode at 510. However, in other examples, power to the one or more tilt-adjustable rotors is adjusted while tilting the one or more tilt-adjustable rotors when transitioning between the hover mode and the cruise mode at 510.

Further, the transitioning between the hover mode and the cruise mode at 510 comprises maintaining a tilt angle of (e.g., not tilting) the one or more fixed-tilt rotors, since the fixed-tilt rotors are fixed and are not configured to be tilted.

As used herein, a controller may be any suitable device or devices that are configured to perform the functions of the controller discussed herein. For example, the controller may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure.

Additionally or alternatively, one or more of computer(s) may include, or be configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

Illustrative, non-exclusive examples of inventive subject matter according to the present disclosure are described in the following enumerated paragraphs:

A1. An aircraft comprising:
an airframe comprising one or more wings;
one or more tilt-adjustable rotors positioned forward of the one or more wings; and
one or more fixed-tilt rotors positioned behind at least one of the one or more wings.

A2. The aircraft of paragraph A1, wherein an axis of rotation of the one or more tilt-adjustable rotors is configured to be selectively tilted relative to a pitch of the aircraft.

A3. The aircraft of any of paragraphs A1 and A2, wherein the one or more tilt-adjustable rotors are configured to be selectively tilted between a horizontal position in which the one or more tilt-adjustable rotors are parallel to a pitch of the aircraft and an axis of rotation of the one or more tilt-adjustable rotors is orthogonal to the pitch of the aircraft, and a vertical position in which the one or more tilt-adjustable rotors are orthogonal to the pitch of the aircraft and the axis of rotation of the one or more tilt-adjustable rotors is parallel to the pitch of the aircraft.

A3.1. The aircraft of paragraph A3, wherein the one or more tilt-adjustable rotors are adjusted to the vertical position in a cruise mode and to the horizontal position in a hover mode.

A3.2. The aircraft of any of paragraphs A3 and A3.1, wherein the one or more tilt-adjustable rotors faces up in the horizontal position.

A3.3. The aircraft of any of paragraphs A3-A3.2, wherein the one or more tilt-adjustable rotors are configured to be selectively tilted to a plurality of positions between the horizontal position and the vertical position.

A4. The aircraft of any of paragraphs A1-A3.3, wherein an axis of rotation of the one or more fixed-tilt rotors is fixed relative to a pitch of the aircraft.

A5. The aircraft of any of paragraphs A1-A4, wherein the one or more wings are fixed wings that do not rotate relative to a pitch of the aircraft.

A6. The aircraft of any of paragraphs A1-A5, wherein the one or more wings comprise flight control surfaces that are configured to be selectively adjusted to change an airfoil of the one or more wings.

A7. The aircraft of any of paragraphs A1-A6, further comprising support elements coupled to the one or more tilt-adjustable rotors, the one or more fixed-tilt rotors, and at least one of the one or more wings to secure the one or more tilt-adjustable rotors and the one or more fixed-tilt rotors to the airframe.

A7.1. The aircraft of paragraph A7, wherein the support elements are coupled to the one or more wings and extend forward and aft of the one or more wings along a length of the aircraft.

A7.2. The aircraft of any of paragraphs A7 and A7.1, wherein the support elements are rigid and do not tilt.

A7.3. The aircraft of any of paragraphs A7-A7.2, wherein the one or more tilt-adjustable rotors are configured to be selectively tilted relative to the support elements and wherein the one or more fixed-tilt rotors are fixed relative to the support elements and are not configured to be selectively tilted relative to the support elements.

A8. The aircraft of any of paragraphs A1-A7.3, further comprising power sources configured to selectively provide power to the one or more tilt-adjustable rotors and the one or more fixed-tilt rotors.

A8.1. The aircraft of paragraph A8, wherein the power sources are configured to independently selectively adjust an amount of power provided to the one or more tilt-adjustable rotors relative to the one or more fixed-tilt rotors.

A8.2. The aircraft of any of paragraphs A8 and A8.1, wherein the power sources are positioned exterior to the one of the one or more wings and are coupled to at least one of the one or more wings.

A8.3. The aircraft of any of paragraphs A8-A8.2 when depending from any of paragraphs A7-A7.3, wherein the power sources are coupled to the support elements.

A8.3.1 The aircraft of paragraph A8.3, wherein the power sources are coupled to a bottom of the support elements, such that the power sources are positioned below the one or more wings and below the support elements.

A8.3.2. The aircraft of any of paragraphs A8.3 and A8.3.1, wherein the power sources are configured to be selectively repositioned relative to the support elements to adjust a center of gravity of the aircraft.

A8.4. The aircraft of any of paragraphs A8-A8.3.2, wherein the power sources are configured to be selectively repositioned relative to the one or more wings to adjust a center of gravity of the aircraft.

A8.4.1 The aircraft of paragraph A8.4, wherein the power sources are configured to be selectively repositioned forward and aft relative to the one or more wings.

A8.5 The aircraft of any of paragraphs A8-A8.4.1, further comprising electric motors configured to spin the one or more tilt-adjustable rotors and the one or more fixed-tilt rotors, wherein the power sources comprise batteries that are configured to provide electric power to electric motors of the one or more tilt-adjustable rotors and the one or more fixed-tilt rotors.

A9. The aircraft of any of paragraphs A1-A8.5, further comprising a fuselage, wherein the fuselage is configured to carry one or more of crew, passengers, and cargo.

A9.1 The aircraft of paragraph A9 when depending from any of paragraphs A7-A7.3 and A8-A8.3.2, wherein the support elements are positioned exterior to, and away from, the fuselage.

A9.2. The aircraft of paragraph A9 when depending from any of paragraphs A8-A8.5, wherein the power sources are positioned exterior to, and away from, the fuselage.

A9.2.1. The aircraft of paragraph A9.2, wherein the power sources are positioned exterior to the one or more wings.

A9.3 The aircraft of any of paragraphs A9-A9.2.1, wherein the fuselage comprises a door that is configured to selectively open for ingress and egress of one or more of: the crew, the passengers, and the cargo.

A9.3.1. The aircraft of paragraph A9.3, wherein the door is positioned below the one or more wings relative to the ground when the aircraft is upright on level ground.

A10. The aircraft of any of paragraphs A7-A7.3, A8.3-A8.3.2, and A9.1-A9.3.1, further comprising a tail coupled to at least one of the support elements.

A11. The aircraft of any of paragraphs A1-A10, wherein the one or more wings comprise a forward set of wings and an aft set of wings.

A11.1 The aircraft of paragraph A11 when depending from any of paragraphs A7-A7.3 and A8.3-A8.3.2, wherein each of the support elements is coupled to at least one wing of the forward set of wings and at least one wing of the aft set of wings, and wherein each of the support elements extend beyond the forward set of wings and the aft set of wings.

A11.2. The aircraft of any of paragraphs A11 and A11.1, wherein the one or more fixed-tilt rotors comprises a first set of fixed-tilt rotors that is positioned between the forward set of wings and the aft set of wings, and a second set of fixed-tilt rotors that is positioned behind the aft set of wings.

A11.2.1. The aircraft of paragraph A11.2, wherein the first set of fixed-tilt rotors and the second set of fixed-tilt rotors do not tilt relative to the support elements.

A11.3. The aircraft of any of paragraphs A11.2 and A11.2.1, wherein the one or more tilt-adjustable rotors comprises four rotors and wherein the first set of fixed-tilt rotors comprises four rotors and wherein the second set of fixed-tilt rotors comprises four rotors.

A11.3.1. The aircraft of paragraph A11.3, wherein at least two rotors of the one or more tilt-adjustable rotors are staggered forward and aft of one another.

A11.3.1.1. The aircraft of paragraph A11.3.1, when depending from any of paragraphs A9-A9.3.1, wherein the one or more tilt-adjustable rotors comprise an inner set of tilt-adjustable rotors that is positioned more proximate the fuselage, and an outer set of tilt-adjustable rotors that is positioned more distal from the fuselage, wherein the inner set of tilt-adjustable rotors are positioned forward of the outer set of tilt-adjustable rotors.

A11.4. The aircraft of any of paragraphs A11.2-A11.3.1.1, wherein each tilt-adjustable rotor of the one or more tilt-adjustable rotors are configured to be independently selectively tilted.

A12. The aircraft of any of paragraphs A1-A11.4, further comprising a controller, the controller comprising:

non-transitory memory comprising computer readable instructions for executing the methods of any of paragraphs B1-B22; and a processor for executing the computer readable instructions to perform the methods of any of paragraphs B1-B22.

A13. The aircraft of any of paragraphs A1-A12, wherein the aircraft is an autonomous aircraft.

A14. The aircraft of any of paragraphs A1-A13, wherein the aircraft is a remote controlled aircraft.

A15. The aircraft of any of paragraphs A1-A14, wherein the aircraft is configured to transition from a hover mode, in which the one or more tilt-adjustable rotors are adjusted to the horizontal position, and a cruise mode, in which the one or more tilt-adjustable rotors are adjusted to the vertical position, while at least a subset of the one or more fixed-tilt rotors are powered.

B1. A method for enhancing operation of an aircraft, the method comprising:

tilting only one or more forward rotors positioned in front of one or more wings of the aircraft, while maintaining a fixed tilt angle of one or more rearward rotors positioned behind at least one of the one or more wings.

B2. The method of paragraph B1, wherein the tilting only the one or more forward rotors comprises selectively tilting only the one or more forward rotors between a horizontal position and a vertical position to adjust an amount of forward thrust provided by the one or more forward rotors, wherein the horizontal position is a position where an axis of rotation of the one or more forward rotors is orthogonal to a pitch of the aircraft, and wherein the vertical position is a position where the axis of rotation of the one or more forward rotors is parallel to a pitch of the aircraft.

B3. The method of paragraph B2, wherein the tilting only the one or more forward rotors between the horizontal position and the vertical position to adjust an amount of forward thrust provided by the one or more forward rotors comprises tilting at least one of the one or more forward rotors towards a more vertical position to increase thrust in a forward direction.

B4. The method of any of paragraphs B2 and B3, wherein the tilting only the one or more forward rotors between the horizontal position and the vertical position to adjust an amount of forward thrust provided by the one or more forward rotors comprises tilting at least one of the one or more forward rotors towards a more horizontal position to decrease thrust in a forward direction.

B5. The method of any of paragraphs B1-B4, wherein an axis of rotation of the one or more rearward rotors is fixed such that the one or more rearward rotors are not configured to be tilted.

B6. The method of any of paragraphs B1-B5, further comprising operating the aircraft in a hover mode, wherein the operating the aircraft in the hover mode comprises operating the one or more forward rotors and the one or more rearward rotors to only generate thrust in a substantially vertical direction with respect to level ground.

B7. The method of paragraph B6 when depending from any of paragraphs B2-B4, wherein the operating the aircraft in the hover mode further comprises adjusting the one or more forward rotors to the horizontal position.

B8. The method of any of paragraphs B6 and B7, wherein the operating the aircraft in the hover mode further comprises powering all of the one or more forward rotors and the one or more rearward rotors to generate thrust.

B9. The method of any of paragraphs B6-B8, further comprising operating the aircraft in a cruise mode, wherein the operating the aircraft in the cruise mode comprises operating the one or more forward rotors to generate thrust in a forward direction with respect to a front of the aircraft.

B10. The method of paragraph B9 when depending from paragraph B7, wherein the operating the one or more forward rotors to generate thrust in a forward direction comprises tilting the one or more forward rotors to the vertical position.

B11. The method of any of paragraphs B9 and B10, wherein the operating the aircraft in the cruise mode further comprises powering off the one or more rearward rotors.

B12. The method of any of paragraphs B9-B11, further comprising transitioning between the hover mode and the cruise mode by tilting the one or more forward rotors.

B13. The method of paragraph B12, wherein the transitioning between the hover mode and the cruise mode comprises tilting the one or more forward rotors towards a more vertical position when transitioning from the hover mode towards the cruise mode.

B14. The method of any of paragraphs B12 and B13, wherein the transitioning between the hover mode and the cruise mode comprises tilting the one or more forward rotors towards a more horizontal position when transitioning from the cruise mode towards the hover mode.

B15. The method of any of paragraphs B12-B14, wherein the transitioning between the hover mode and the cruise mode comprises adjusting an amount of power supplied to the one or more rearward rotors.

B16. The method of paragraph B15, wherein the adjusting an amount of power supplied to the one or more rearward rotors comprises decreasing an amount of power supplied to the one or more rearward rotors when transitioning from the hover mode to the cruise mode.

B17. The method of paragraph B15, wherein the adjusting an amount of power supplied to the one or more rearward rotors comprises maintaining the amount of power supplied to the one or more rearward rotors when transitioning from the hover mode to the cruise mode, and then cutting off power to the one or more rearward rotors when the one or more forward rotors reach the vertical position to switch to the cruise mode.

B18. The method of paragraph B17, further comprising reducing power to the one or more forward rotors when tilting the one or more forward rotors to the vertical position, and then increasing power to the one or more forward rotors when the one or more forward rotors reach the vertical position.

B19. The method of any of paragraphs B15-B18, further comprising increasing an amount of power supplied to the one or more rearward rotors when transitioning from the cruise mode to the hover mode.

B20. The method of any of paragraphs B1-B17, further comprising tilting at least one of the one or more forward rotors independently of the other one or more forward rotors to adjust a yaw of the aircraft.

B21. The method of any of paragraphs B1-B20, further comprising repositioning rotor power sources coupled beneath the one or more wings of the aircraft to adjust a center of gravity of the aircraft.

B22. The method of paragraph B21, wherein the repositioning comprises moving the rotor power sources forward or aft relative to the one or more wings.

B23. The method of any of paragraphs B21 and B22, wherein the rotor power sources comprise batteries that provide electrical power to the one or more forward rotors and the one or more rearward rotors, and wherein the method further comprises adjusting an amount of power supplied to the one or more forward rotors and the one or more rearward rotors by the batteries.

B24. The method of any of paragraphs B1-B23, further comprising powering both the one or more forward rotors and the one or more rearward rotors while tilting the one or more forward rotors.

C1. The use of the aircraft of any of paragraphs A1-A15 for transporting one or more of cargo, crew, and passengers.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An aircraft comprising:
   an airframe comprising a forward set of wings and an aft set of wings;
   one or more tilt-adjustable rotors, wherein all of the one or more tilt-adjustable rotors are positioned forward of the forward set of wings;
   a first set of fixed-tilt rotors positioned between the forward set of wings and the aft set of wings; and
   a second set of fixed-tilt rotors positioned behind the aft set of wings;
   wherein every rotor of each set of the fixed-tilt rotors are positioned behind all of the one or more tilt-adjustable rotors.

2. The aircraft of claim 1, wherein an axis of rotation of the one or more tilt- adjustable rotors is configured to be selectively tilted relative to a pitch of the aircraft.

3. The aircraft of claim 1, wherein the one or more tilt-adjustable rotors are adjusted to a vertical position in a cruise mode and to a horizontal position in a hover mode.

4. The aircraft of claim 1, wherein an axis of rotation of each of the first set of fixed-tilt rotors and the second set of fixed-tilt rotors is fixed relative to a pitch of the aircraft.

5. The aircraft of claim 1, further comprising support elements coupled to the one or more tilt-adjustable rotors, the first set of fixed-tilt rotors, the second set of fixed-tilt rotors, and at least one wing of the forward set of wings and at least one wing of the aft set of wings, wherein the support elements couple the one or more tilt-adjustable rotors, the first set of fixed-tilt rotors, and the second set of fixed-tilt rotors to the airframe.

6. The aircraft of claim 1, wherein the one or more tilt-adjustable rotors comprise four tilt-adjustable rotors, and wherein at least two tilt-adjustable rotors of the one or more tilt-adjustable rotors are staggered forward and aft of one another.

7. The aircraft of claim 1, wherein each tilt-adjustable rotor of the one or more tilt-adjustable rotors is configured to be independently selectively tilted.

8. The aircraft of claim 1, wherein the aircraft is configured to transition from a hover mode, in which the one or more tilt-adjustable rotors are adjusted to a horizontal position, and a cruise mode, in which the one or more tilt-adjustable rotors are adjusted to a vertical position, while at least a subset of the first set of fixed-tilt rotors and the second set of fixed-tilt rotors are powered.

9. The aircraft of claim 1, wherein an entirety of each of the one or more tilt-adjustable rotors is positioned forward of the forward set of wings.

10. The aircraft of claim 1, further comprising power sources coupled to at least one wing of the forward set of wings and the aft set of wings and positioned exterior to the forward set of wings and the aft set of wings.

11. The aircraft of claim 10, wherein the power sources are configured to be selectively repositioned relative to the forward set of wings and the aft set of wings to adjust a center of gravity of the aircraft.

12. A method for enhancing operation of an aircraft, the method comprising:
    tilting only forward rotors positioned in front of all wings of the aircraft, and maintaining a fixed-tilt angle of all rearward rotors positioned behind the forward rotors, wherein the rearward rotors are positioned between a forward wing and an aft wing and positioned behind the aft wing.

13. The method of claim 12, further comprising tilting at least one of the forward rotors independently of other ones of the forward rotors to adjust a yaw of the aircraft.

14. The method of claim 12, further comprising repositioning rotor power sources coupled beneath one or more of the forward wing and the aft wing to adjust a center of gravity of the aircraft.

15. The method of claim 12, wherein the tilting only the forward rotors comprises selectively tilting only the forward rotors between a horizontal position and a vertical position to adjust an amount of forward thrust provided by the forward rotors, wherein the horizontal position is a position where an axis of rotation of each forward rotor is orthogonal to a pitch of the aircraft, and wherein the vertical position is a position where the axis of rotation of each forward rotor is parallel to the pitch of the aircraft.

16. The method of claim 12, further comprising operating the aircraft in a hover mode, wherein the operating the aircraft in the hover mode comprises operating the forward rotors and the rearward rotors to only generate thrust in a substantially vertical direction with respect to level ground.

17. The method of claim 16, further comprising operating the aircraft in a cruise mode, wherein the operating the aircraft in the cruise mode comprises operating the forward rotors to generate thrust in a forward direction with respect to a front of the aircraft.

18. The method of claim 17, wherein the operating the aircraft in the cruise mode further comprises powering off the rearward rotors.

19. The method of claim 17, further comprising transitioning between the hover mode and the cruise mode, wherein the transitioning between the hover mode and the cruise mode comprises the tilting only the forward rotors.

20. The method of claim 19, wherein the transitioning between the hover mode and the cruise mode comprises maintaining power to the rearward rotors.

* * * * *

UNITED STATES PATENT AND TRADEMARK OFFICE
CERTIFICATE OF CORRECTION

Page 1 of 1

PATENT NO. : 11,554,865 B2
APPLICATION NO. : 16/794040
DATED : January 17, 2023
INVENTOR(S) : Tony Shuo Tao et al.

It is certified that error appears in the above-identified patent and that said Letters Patent is hereby corrected as shown below:

On the Title Page

Item "(71) Applicant," the text should be changed to --AURORA FLIGHT SCIENCES CORPORATION, a subsidiary of THE BOEING COMPANY, Manassas, VA (US)--; and Item "(73) Assignee," the text should be changed to --AURORA FLIGHT SCIENCES CORPORATION, a subsidiary of THE BOEING COMPANY, Manassas, VA (US)--.

Signed and Sealed this
Twenty-fourth Day of October, 2023

Katherine Kelly Vidal
*Director of the United States Patent and Trademark Office*